United States Patent
Gentry et al.

(10) Patent No.: US 7,818,570 B2
(45) Date of Patent: Oct. 19, 2010

(54) EXCLUSIVE SET SYSTEM CONSTRUCTIONS INCLUDING, BUT NOT LIMITED TO, APPLICATIONS TO BROADCAST ENCRYPTION AND CERTIFICATE REVOCATION

(75) Inventors: Craig B. Gentry, Mountain View, CA (US); Zulfikar Amin Ramzan, San Mateo, CA (US); David P. Woodruff, Cambridge, MA (US)

(73) Assignee: NTT DoCoMo, Inc., Tokyo (JP)

( * ) Notice: Subject to any disclaimer, the term of this patent is extended or adjusted under 35 U.S.C. 154(b) by 973 days.

(21) Appl. No.: 11/554,405

(22) Filed: Oct. 30, 2006

(65) Prior Publication Data

US 2007/0180003 A1    Aug. 2, 2007

Related U.S. Application Data

(60) Provisional application No. 60/732,328, filed on Oct. 31, 2005.

(51) Int. Cl.
    *H04L 9/32* (2006.01)
(52) U.S. Cl. .................................. 713/168; 713/156
(58) Field of Classification Search ......... 380/156–158; 713/180, 156, 168
    See application file for complete search history.

(56) References Cited

U.S. PATENT DOCUMENTS 5,592,552 A * 1/1997 Fiat ............................ 713/163
5,666,416 A   9/1997 Micali
2002/0007457 A1 * 1/2002 Neff ........................... 713/180

FOREIGN PATENT DOCUMENTS

WO    WO03/090429 A1 * 10/2003
WO    WO2005/043326 A2 * 5/2005

OTHER PUBLICATIONS

W. Aiello, S. Lodha, and R. Ostrovsky. Fast digital identity revocation. In *In proceedings of Asiacrypt '01*, 2001.
R.C. Baker, G. Harman, and J. Pintz. The difference between consecutive primes II, London Math. Soc. (3) 83 (2001), pp. 532.562.
U. Feige. A threshold of ln n for approximating set cover, JACM, 1998, pp. 634-652.
A. Fiat and M. Naor. Broadcast encryption, Crypto, 1993, pp. 480-491.
E. Gafni, J. Staddon, and Y. L. Yin. Efficient methods for integrating traceability and broadcast encryption, Crypto, 1999, pp. 372-387.
R. Kumar, S. Rajagopalan, and A. Sahai. Coding constructions for blacklisting problems without computational assumptions, Crypto, 1999, pp. 609-623.

(Continued)

*Primary Examiner*—Kambiz Zand
*Assistant Examiner*—Peter Poltorak
(74) *Attorney, Agent, or Firm*—Haynes and Boone, LLP; Michael Shenker

(57) ABSTRACT

An (n,k,r,t)-exclusive set system over a set U includes elements $S_f$ each of corresponds to a polynomial $f(u)$ in one or more coordinates of $u \in U$. The polynomial is zero on $U \setminus S_f$ but is not zero on $S_f$. In some embodiments, an asymptotically low key complexity k is provided.

59 Claims, 8 Drawing Sheets

OTHER PUBLICATIONS

R. Kumar and A. Russell. A note on the set systems used for broadcast encryption, SODA, 2003, pp. 470-471.

J. Lotspiech, D. Naor, and M. Naor. Revocation and tracing schemes for stateless receivers, Crypto, 2001, pp. 41-62.

A. Lubotzky, R. Phillips, and P. Samak. Explicit expanders and the Ramanujan conjectures, STOC, pp. 240-246. See also: A. Lubotzky, R. Phillips, and P. Sarnak, Ramanujan graphs, Combinatorica 8, 1988, pp. 261-277.

M. Luby and J. Staddon. Combinatorial Bounds for Broadcast Encryption, Eurocrypt, 1998, pp. 512-526.

C. Lund and M. Yannakakis. On the hardness of approximating minimization problems, JACM, 1994, pp. 960-981.

S. Micali. Efficient Certificate Revocation. MIT/LCS/TM 542b, Massachusetts Institute of Technology, 1996.

S. Micali. NOVOMODO: scalable certificate validation and simplified PKI management. In Proceedings of the 1st Annual PKI Research Workshop, 2002.

Kaltofen, E. et al. "Distributed Matrix-Free Solution of Large Sparse Linear Systems Over Finite Fields," Journal Algorithmica, Publisher Springer New York Issue, vol. 24, Nos. 3-4, Aug. 1999, pp. 331-348.

International Search Report for PCT Application No. PCT/US2006/060405 dated Feb. 22, 2008, 2 pages.

Written Opinion of the International Searching Authority for PCT Application No. PCT/US2006/060405 dated Feb. 22, 2008, 2 pages.

\* cited by examiner $S_i \longleftrightarrow k_{S_i}$  FIG. 3 PRIOR ART

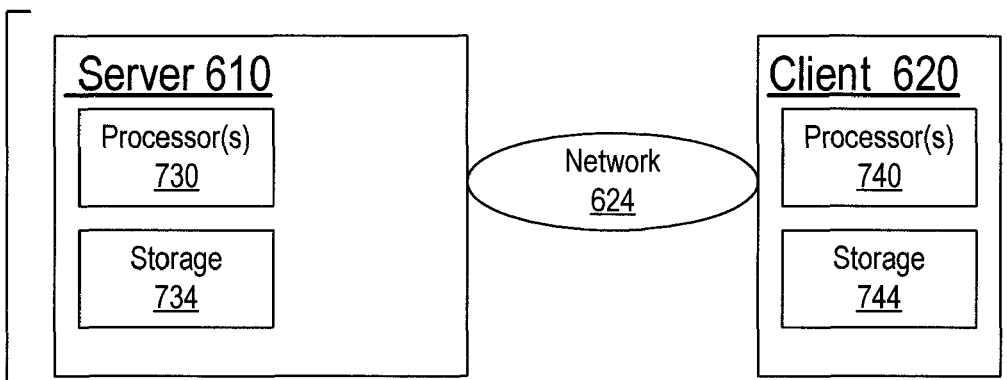
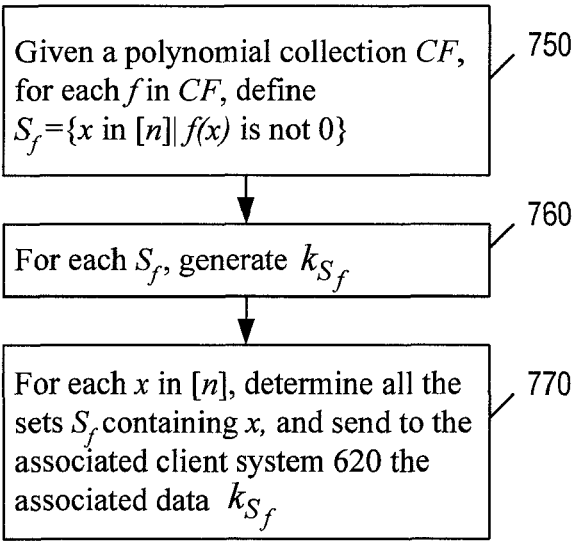
FIG. 7
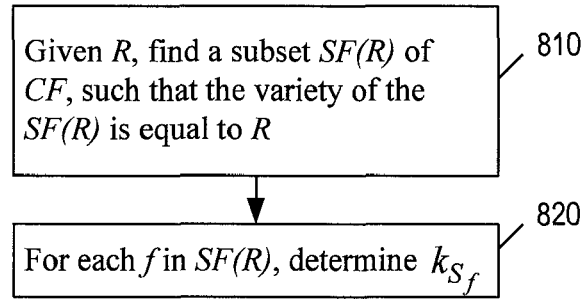
FIG. 8

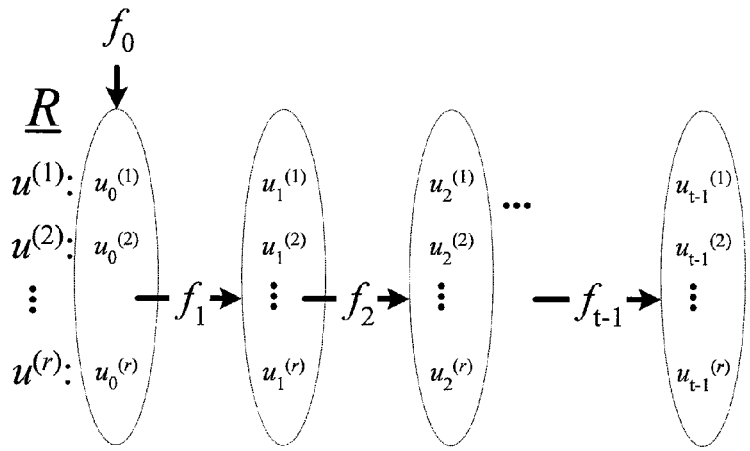
FIG. 9
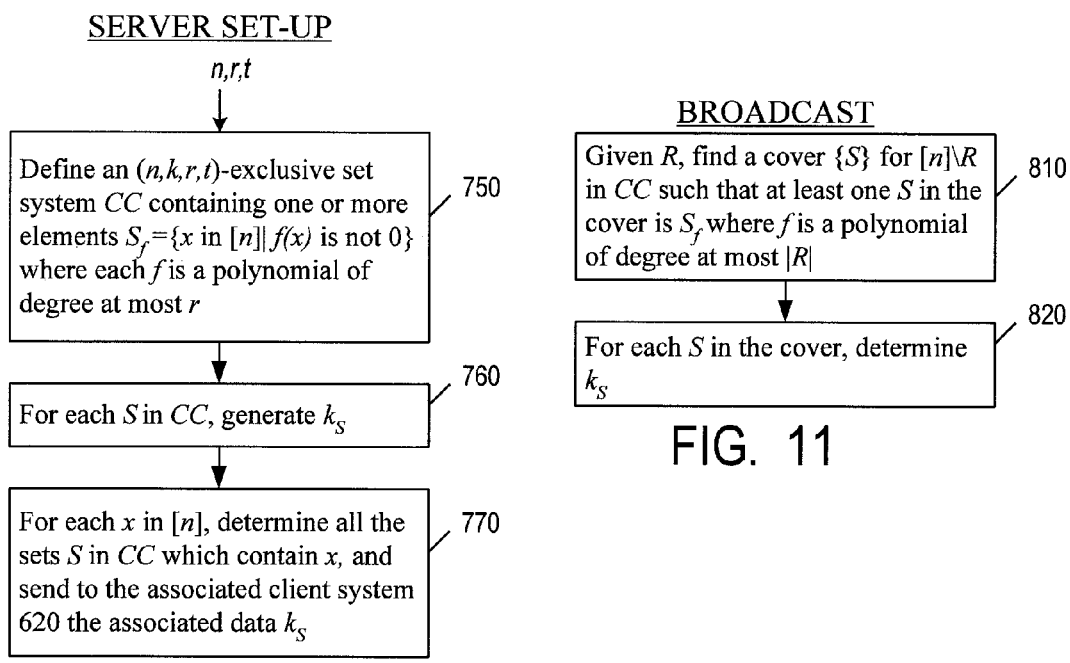
FIG. 10
FIG. 11 ies to broadcast encryption and certificate revocation.

EXCLUSIVE SET SYSTEM CONSTRUCTIONS INCLUDING, BUT NOT LIMITED TO, APPLICATIONS TO BROADCAST ENCRYPTION AND CERTIFICATE REVOCATION

CROSS REFERENCE TO RELATED APPLICATIONS

The present application claims priority of U.S. provisional application No. 60/732,328, filed Oct. 31, 2005, incorporated herein by reference.

BACKGROUND OF THE INVENTION

This invention relates to data processing, and in particular to exclusive set systems such as can be used for cryptographic and other applications.

EXCLUSIVE SET SYSTEMS. In [8] Kumar and Russell formalized the notion of an exclusive set system, which is a family of sets for which every large subset of the universe can be written as the union of some collection of subsets from the family. More formally, Definition 1. A family of subsets $CC=\{S_1, \ldots, S_k\}$ over $[n]$ is $(n,k,r,t)$-exclusive if for any subset $R \subset [n]$ with $|R| \leq r$, we can write $$[n] \setminus R = \bigcup_{j=1}^{t} S_{i_j}$$

for some $1 \leq i_j \leq k$. Indices $i_j$ do not have to be distinct, so R can be the union of less than t distinct sets $$S_{i_j}$$

Here $[n]$ denotes the set of positive integers $\{1, \ldots, n\}$. Clearly, $[n]$ can be replaced with any set U of n entities.

The family $$\{S_{j_1}, \ldots, S_{j_t}\}$$

is called a cover for the set $[n]\setminus R$ or a complement cover for R, and is sometimes denoted $C_R$ herein.

In the example of FIG. 1, the elements of $[n]$ are shown as crosses in a two-dimensional plane. Each element $i \in [n]$ is marked with reference numeral 104.$i$. The set R consists of element 104.1, 104.2, 104.3 ($r \geq 3$). The set $[n]\setminus R$ is covered by three sets $S_1, S_2, S_3$ ($t \geq 3$ and $k \geq 3$), where $S_1=\{4,5,6\}$, $S_2=\{6,7\}$, and $S_3=\{8\}$.

Determining the exact tradeoff between n,k,r, and t is a fundamental combinatorial problem with significant applications in computer science.

APPLICATION TO BROADCAST ENCRYPTION. In a broadcast encryption scheme, there is a server 210 (FIG. 2A) sending a broadcast to n clients 104.1-104.$n$. The broadcast content B is encrypted with some symmetric encryption algorithm 1 (as shown at 220) using a secret key bk. The encrypted content $E1_{bk}(B)$ is broadcast to the clients 104. Each client 104.$i$ possesses an encryption key $k_i$ for a symmetric encryption algorithm 2. In this example, the set R of revoked clients consists of terminals $\{1, \ldots, r\}$, i.e. $\{104.1, \ldots, 104.r\}$. The server encrypts the key bk with the algorithm 2 (as shown at 230) n-r times using the respective keys $k_{r+1}, \ldots, k_n$ of the non-revoked clients. The resulting encryptions are shown as $$E2_{k_{r+1}}(bk), \ldots, E2_{k_n}(bk).$$

The server broadcasts these encryptions.

Each client 104 (FIG. 2B) receives these broadcasts. The non-revoked clients 104.$r$+1, ..., 104.$n$ each execute a decryption algorithm 2 (as shown at 240) corresponding to the encryption algorithm 2. At step 240, each of these clients $i$ ($i=r+1, \ldots, n$) uses the corresponding key $k_i$ and the encryption $$E2_{k_i}(bk)$$

to recover the key bk. The key bk and the broadcast encryption $E1_{bk}(B)$ are then provided as inputs to a decryption algorithm 1 corresponding to the encryption algorithm 1, as shown at 250. The output is the broadcast content B.

The revoked clients 104.1, ..., 104.$r$ cannot recover the broadcast content B because they do not receive the encryptions of the broadcast key bk with the keys $k_1, \ldots, k_r$.

In this example, each broadcast includes n-r encryptions at step 230. The number of encryptions can be reduced to at most t if each set $S_i$ is associated with an encryption key $$k_{S_i}$$

provided to all clients 104 which are members of the set $S_i$. See FIG. 3. The server determines the set cover $$\{S_{i_j} \mid j=1, \ldots, t\}$$

for the set $[n]\setminus R$. At step 230 (FIG. 4A), the server 210 encrypts the key bk using the corresponding keys $$k_{S_{i_j}}$$

. Since only the non-revoked clients each have one or more of the keys $$k_{S_{i_j}},$$

only these clients will be able to recover the key bk at step 240 (FIG. 4B) and recover the broadcast content B. At step 240, the client can use any key $$k_{S_{i_j}}$$

for the set $$S_{i_j}$$

to which the client belongs. Any coalition of the revoked members (revoked clients) learns no information from the broadcast even if they collude.

Since each subset of t keys can correspond to at most one set [n]\R, we need $$\binom{k}{t} \geq \sum_{i=0}^{r} \binom{n}{i} \geq \binom{n}{r},$$

or equivalently, $$k = \Omega\left(t\binom{n}{r}^{r/t}\right).$$

(The lower bound we use here is the same as that given by Lemma 11 in [11], and is unknown to be tight for general n,r, and t. We note that the bounds in that paper are generally not tight.) For instance, their Theorem 12 can be improved by using the sunflower lemma with relaxed disjointness (p. 82 in [6]) instead of the sunflower lemma. This general technique of using exclusive set systems for broadcast encryption in known in the art as the subset-cover framework.

APPLICATION TO CERTIFICATE REVOCATION. In FIG. 5, elements 104 are digital certificates used in public key infrastructures (PKI) to facilitate secure use and management of public keys in a networked computer environment. Each certificate 104 contains a user's public key PK and the user's name and may also contain the user's email address or addresses, the certificate's serial number SN (generated by a certificate authority 610 (FIG. 6A) to simplify the certificate management), the certificate issue date D1, the expiration date D2, an identification of algorithms to be used with the public and secret keys, an identification of the CA 610, validity proof data 104-V (described below) and possibly other data. The data mentioned above is shown at 104D. Certificate 104 also contains CA's signature 104-$\text{Sig}_{CA}$ on the data 104D. CA 610 sends the certificate 104 to the user's (key owner's) computer system (not shown). Either the owner or the CA 610 can distribute the certificate to other parties to inform them of the user's public key PK. Such parties can verify the CA's signature 104-$\text{Sig}_{CA}$ with the CA's public key to ascertain that the certificate's public key PK does indeed belong to the person whose name and email address are provided in the certificate.

If a certificate 104 is revoked, other parties must be prevented from using the certificate. Validity proof data 104-V is used to ascertain that the certificate is valid. In existing certificate revocation schemes known in the art, such as the one of Micali [13,14,15] and subsequently by Aiello et al., [1], in each period m (e.g. each day), certificate authority 610 issues a validation proof $c_m$ for each non-revoked certificate in the public-key infrastructure. CA's clients 620 (FIG. 6B) provide the validation proof $c_m$ for the certificate with the certificate's validity data 104-V to a verification algorithm, as shown at 630. The verification algorithm's output indicates whether or not the certificate is valid in the period m.

In the original work of Micali, one validation proof was issued per non-revoked certificate. Thus the overall communication complexity of the system was proportional to n·r where n is the total number of users and r is the number of non-revoked certificates. Aiello et al. observed that instead of having one validation proof apply to one individual user, one could instead group users together into various subsets $S_i$ as in the definition 1. In FIGS. 3 and 6A, each subset $S_i$ is associated with cryptographic information $k_{s_i}$ from which the CA can generate a validation proof $c_m(S_i)$ for the period m. This single validation proof proves the validity of all the certificates in the subset $S_i$. For each period m, the CA determines a cover { $S_{i_j}$ } for the set of non-revoked certificates, computes the validation proofs $c_m(S_{i_j})$, and distributes the validation proofs to the clients 620 (which may include the certificate owners and/or other parties).

Since each subset $S_i$ must be provided with a validity proof $c_m(S_i)$, the number of total validity proofs may increase, but the communication complexity for transmitting the proofs is now proportional to the t parameter in the underlying exclusive-set system, and generally speaking, t<n−r, so the overall communication needed for this approach is less than that needed for the original Micali approach.

SUMMARY

This section summarizes some features of the invention. The invention is not limited to these features, as defined by the appended claims.

Some embodiments of the present invention provide an actual design of the exclusive-set systems to be used. By designing good set systems, one can achieve near optimal tradeoffs among the relevant parameters of interest. In the foregoing we illustrate the methods and apparatus of the present invention by means of the application to the broadcast encryption problem. It will be readily apparent to one skilled in the art that they can just as easily be used in other settings, such as the one for certificate revocation mentioned above.

Kumar and Russell [8] use the probabilistic method to show that for sufficiently large n and any r≦t, there exists an exclusive set system with size $O(t^3(nt)^{r/t}\ln n)$. The main drawback of their scheme is that they do not give an efficient algorithm for generating $$S_{i_1}, \ldots, S_{i_t}$$

with $$[n]\backslash R = S_{i_1} \cup \ldots \cup S_{i_t}.$$

Moreover, their sets $S_i$ are chosen independently at random and so any algorithm for finding the $S_i$ can be used to solve Set-Cover, which is well-known to be NP-hard and ln n-in-approximable [3, 12]. Thus, with respect to known algorithms, in the worst-case broadcasting takes time exponential in n. Oftentimes, even time polynomial in n is considered too large, as r,t are usually much smaller. Hence, it is desirable to have algorithms running in time poly(r, t, log n). (If unspecified, logarithms are to the base 2.)

For some embodiments, the present invention provides an explicit construction of an (n,k,r,t)-exclusive set system with $$k = poly(r, t, \log n) \binom{n}{r}^{r/t}$$

keys. Unlike previous constructions, the constructions presented in this disclosure work for any values of r,t and sufficiently large n. Moreover, the disclosure provides a deterministic poly(r, t, log n) algorithm, which given R, finds $$S_{i_1}, \ldots, S_{i_t}$$

with $$[n] \backslash R = S_{i_1} \cup \ldots \cup S_{i_t}.$$

Thus, broadcasting is extremely efficient. For the case when r and t are slow-growing functions of n, as is the case in broadcast encryption, we can optimize our storage complexity to $$k = O\left(rt \binom{n}{r}^{r/t}\right),$$

which is tight up to a factor of r. This improves the complexity of [8].

Some embodiments provide a computer-implemented method for generating data representing an exclusive set system for a set U (e.g., U=[n]) of entities such that each element of the exclusive set system is associated with cryptographic data. The method comprises obtaining one or more coordinate systems for the set U, wherein each coordinate system associates each entity in U with a plurality of coordinates; determining functions $f(u)$ each of which is defined on the set U, each function being a polynomial in one or more of the coordinates of u in at least one of the coordinate systems; determining, for each said functions $f$, a corresponding subset $S_f \subset U$ such that $f$ is not equal to a predefined value on $S_f$ but is equal to the predefined value on $U \backslash S_f$, wherein said exclusive set system comprises the subsets $S_f$, and wherein each subset $S_f$ is associated with cryptographic data.

Some embodiments provide a computer-implemented method for selecting a family of subsets of a set U such that each of said subsets is associated with cryptographic data, wherein the union of said subsets includes a predefined set of valid entities and excludes a predefined set R of invalid entities. The method comprises determining functions $f(u)$ each of which is defined on the set U, wherein each entity $u \in U$ is associated with $f$, a plurality of coordinates in each of one or more coordinate systems, and each function $f(u)$ is a polynomial in one or more of the coordinates of u in at least one of the coordinate systems, wherein all of said functions are equal to a predefined value on any entity u in R, and wherein for each valid entity u, at least one of said functions is not equal to the predefined value on the valid entity; determining, for each said functions $f$, a corresponding subset $S_f$ of the valid entities on which the function is not equal to the predefined value, wherein said family of subsets comprises the subsets $S_f$, and wherein each subset $S_f$ is associated with cryptographic data Some embodiments provide a computer-implemented method for generating data representing an (n,k,r,t)-exclusive set system for a set U of entities such that each element of the exclusive set system is associated with cryptographic data, wherein n=|U|, and wherein k, r, and t are predefined positive integers. The method comprises obtaining one or more coordinate systems for the set U, wherein each coordinate system associates each entity in U with a plurality of coordinates; and determining one or more subsets $S \subset U$ in the exclusive set system, each one of said subsets S is a subset $S_f$ corresponding to a function $f(u)$ such that $f(u)$ is not equal to a predefined value on $S_f$ but is equal to the predefined value on $U \backslash S_f$, wherein each function $f(u)$ is a polynomial in one or more of the coordinates of u in at least one of the coordinate systems, the degree of $f(u)$ being at most r, wherein each subset $S_f$ is associated with cryptographic data. In some embodiments, at least one of the functions $f$ is a polynomial of degree r.

Some embodiments provide a computer-implemented method for selecting a cover from an (n,k,r,t)-exclusive set system, the system being defined for a set U of entities such that each element of the exclusive set system is associated with cryptographic data, wherein n=|U|, and wherein k, r, and t are predefined positive integers, the cover being for a set U\R where $R \subset U$ and $|R| \leq r$, the cover comprising at most t elements. The method comprises selecting, for the cover, one or more elements S from the exclusive set system, each one of said elements S is a subset $S_f$ corresponding to a function $f(u)$ such that $f(u)$ is not equal to a predefined value on $S_f$ but is equal to the predefined value on $U \backslash S_f$, wherein each function $f(u)$ is a polynomial in one or more of coordinates of u in at least one coordinate system, the degree of $f(u)$ being at most r, wherein each subset $S_f$ is associated with cryptographic data.

Some embodiments provide a computer-implemented method for generating data representing an exclusive set system CC(U) for a set U of entities. The method comprises generating an exclusive set system $CC(U_B)$ for each of a plurality of subsets $\{U_B\}$ of U; obtaining the exclusive set system for U as a union of the systems $CC(U_B)$; wherein each element of the system CC(U) is associated with cryptographic data.

Some embodiments provide a computer-implemented method for selecting a family of subsets of a set U such that each of said subsets is associated with cryptographic information, wherein the union of said subsets includes a predefined set of valid entities and excludes a predefined set R of invalid entities. The method comprises determining a plurality of disjoint subsets $\{U_j\}$ of the set U such that the union of the subsets $U_j$ equals U, wherein each subset $U_j$ is associated with an exclusive set system $CC(U_j)$ with the maximum revoked set size $r_j \geq |R_j|$, where $R_j = R \cap U_j$; for each subset $U_j$, selecting a cover for $U_j \backslash R_j$ from $CC(U_j)$, wherein the union of said covers provides said family of subsets.

In some embodiments, each entity represents a user operable to receive encrypted information over a network, and each element S of the exclusive set system is associated with cryptographic data which includes a decryption key $DK_S$ provided to the users that are members of the element S, the key being provided for decrypting said information. In some embodiments, each entity represents a cryptographic digital certificate, and each element S of the exclusive set system is associated with said cryptographic data which includes validity data $VD_S$ certifying that the subset S contains only valid certificates or only invalid certificates.

The invention includes computer systems adapted to perform the methods described above; data carriers with computer data representing exclusive set systems described above; and data carriers with computer instructions for computers to perform the methods described above.

Other features of the invention are described below. The invention is defined by the appended claims.

BRIEF DESCRIPTION OF THE DRAWINGS

The subsequent description of the preferred embodiments of the present invention refers to the attached drawings, wherein:

FIG. 3 illustrates a decryption key assigned to a set of clients.

FIG. 7 illustrates server and client computer systems and an exclusive set system generation method according to some embodiments of the present invention.

FIG. 8 is a flowchart for constructing a set cover according to some embodiments of the present invention.

FIG. 9 illustrates a polynomial scheme used for exclusive set systems according to some embodiments of the present invention.

FIG. 10 is a flowchart of an exclusive set system generation method according to some embodiments of the present invention.

FIG. 11 is a flowchart for constructing a set cover according to some embodiments of the present invention.

DESCRIPTION OF SOME EMBODIMENTS

Figure 1:
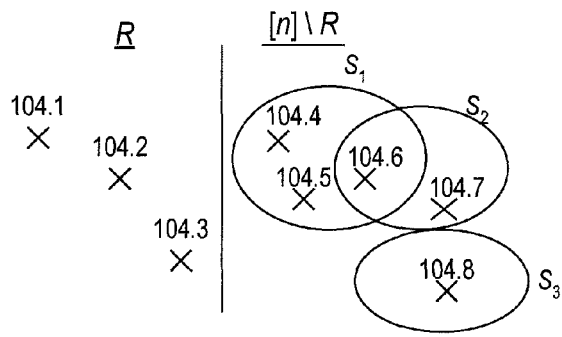
FIG. 1 illustrates a prior art exclusive set system.
Figure 2A:
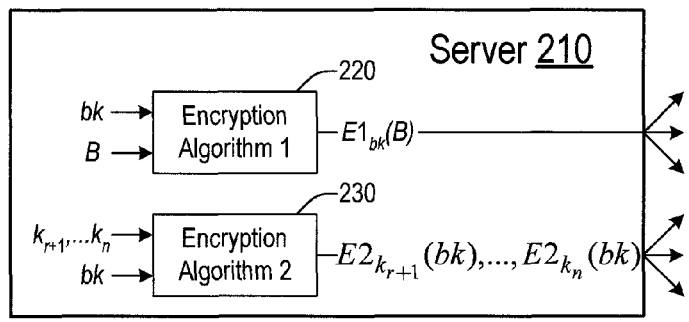
FIG. 2A illustrates a prior art server performing a broadcast encrypted for each non-revoked client.
Figure 2B:
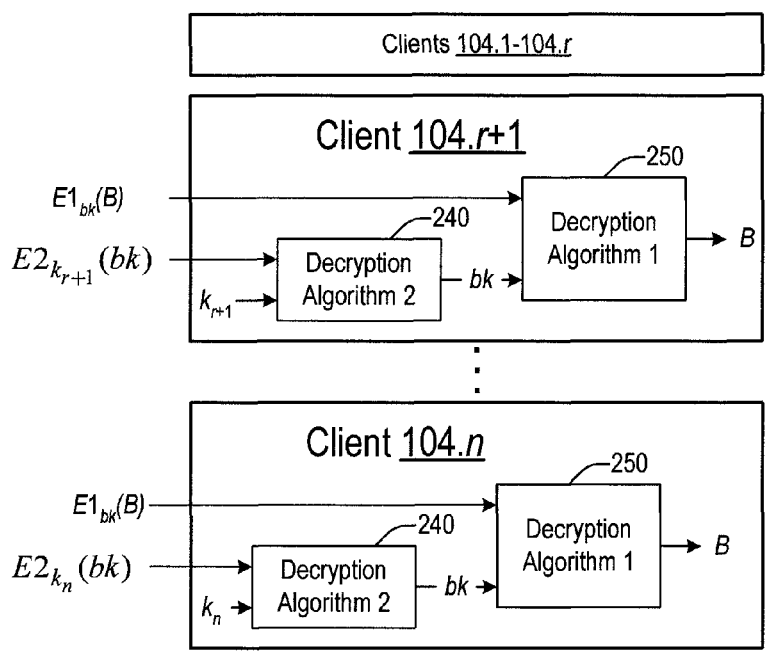
FIG. 2B illustrates prior art clients receiving a broadcast performed as in FIG. 2A.

The present invention will be understood more fully from the detailed description given below and from the accompanying drawings of various embodiments of the invention, which, however, should not be taken to limit the invention to the specific embodiments, but are for explanation and understanding only.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is a method for doing something. The method may require physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMS, and magnetic-optical disks, read-only memories (ROMs), random access memories (RAMs), EPROMs, EEPROMs, magnetic or optical cards, or any type of media suitable for storing computer instructions, and each coupled to a computer system bus.

The present invention is not described with reference to any particular programming language. It will be appreciated that a variety of programming languages may be used to implement the teachings of the invention as described herein. Computer programs can be stored on a data carrier such as a computer-readable medium. Computer programs can also be carried by data carrier signals over networks. A computer-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

1 Preliminaries

COMPUTATIONAL ASSUMPTIONS. It is known to one of ordinary skill in the cryptographic arts that the security of many cryptographic inventions relies upon making certain computational intractability assumptions; for example, one may try to prove that a cryptosystem is secure so long as it is difficult to decompose a specific number into its prime factors efficiently. The term "computational" is often used in the art to identify this class of cryptographic inventions. The present invention provides a computational scheme for password authenticated key exchange. The term "information theoretic" or "unconditional" is often used in the art in conjunction with schemes that are mathematically seen to meet a specific meaningful security definition without making any type of assumption.

While it is generally preferable from a pure security perspective not to have any computational assumptions whatsoever, there are instances of problems that cannot be solved without making such an assumption (the present invention serves as such an example). Further, it is generally known by those skilled in the art that cryptographic methods can sometimes be made more efficient by incorporating computational assumptions.

It also worth noting that often times one assumption implies another. That is, if one of the assumptions were actually true, then another assumption would be seen to be true by a mathematically logical argument. Typically the means used by those skilled in the art to show such an implication, is a transformation (often known in the art as a reduction) that converts a mechanism for violating the second assumption to a mechanism for violating the first assumption. In such cases, the first assumption is called "stronger" or the second "weaker." In general, weaker assumptions are preferable.

The issue of computational versus information-theoretic is orthogonal to the methods and apparatus of the present invention. More specifically, the applications of exclusive-set systems can be practiced using either computational or information-theoretic cryptographic mechanisms.

EXISTENCE ARGUMENTS. It is known to one of ordinary skill in the mathematical arts that determining the existence of a mathematical object satisfying certain properties is not equivalent to actually demonstrating how one can find the object efficiently. In particular, it is sometimes possible to prove that objects with certain properties exist without there being a clear efficient procedure for actually constructing (or finding) tangible instances of such objects. In previous work, Kumar and Russell [8] showed that exclusive set systems satisfying certain tradeoffs existed. They essentially did so by showing that within a very large space of possible options, at least one of them would work. However, this space is so large, that one cannot exhaustively search it to find the actual instance. Furthermore, it appears quite unlikely that a more efficient procedure exists. Finally, even if one were to find the appropriate set systems, it is not clear (in fact, it is even unlikely) that they can incorporated into broadcast encryption schemes in a practical manner. The invention covered by the present disclosure gives the first explicit constructions of such set systems. Furthermore, our systems can be efficiently incorporated into existing broadcast encryption systems.

RANDOMIZED ALGORITHMS. It is known to one of ordinary skill in the data processing arts that many algorithms leverage a source of randomly generated bits to improve performance. One of the methods here does the same. Roughly speaking, using such bits can allow an algorithm to avoid any especially bad cases where it might not perform well. The upshot is that for any input choice (even one specifically crafted to make the algorithm perform bad), a large percentage of the time the algorithm will run efficiently (despite the malicious input choice).

USE OF MATHEMATICAL PROOFS WHEN DESCRIBING METHODS. The methods disclosed herein have their basis in fundamental mathematical concepts. The description of the methods herein prescribes that certain algorithmic steps be executed. However, the key questions of whether the steps can indeed be executed and whether executing them leads to a desired result (in this case an efficient exclusive set system meeting certain performance characteristics) must be addressed by means of a formal mathematical argument. Familiarity with these arguments is not necessary for implementing or practicing the methods disclosed herein. Such arguments merely enable one skilled in the art to determine that the procedures are indeed correct and lead to the desired outcome. Therefore, for completeness, we have included, where appropriate, these arguments in the present disclosure. However the arguments about the correctness, feasibility, and performance of the schemes themselves should be decoupled from the actual methods and apparatus provided in this disclosure.

Previous Solutions

The foregoing reviews common techniques in the art for constructions of exclusive set systems.

Motivated by cryptographic applications, there have been many other constructions of exclusive set systems. Gafni, Staddon, and Y in [5] provide an $(n,(r \log n/\log r)^2, r, (r \log n/\log r)^2)$-exclusive set system. Also, Lotspiech, Naor, and Naor [9] give $(n, 2n, r, r \log n)$ and $(n, n \log n, r, r)$-exclusive set systems based on binary trees. Using algebraic-geometric codes, Kumar, Rajagopalan, and Sahai [7] construct explicit $(n, r^3 \log n/\log r, r, r^3 \log n/\log r)$-exclusive set systems. The main disadvantage of these schemes is that once n and r are chosen, both the broadcast size t and the number of keys k are determined. However, as pointed out in [8], it is clear that given n,r and t, for sufficiently large k there exists an $(n,k,r,t)$-exclusive set system. In contrast, some embodiments of the present invention can support arbitrary n,r, and t. Thus, in some sense, our construction is believed to be the first general result for information-theoretic broadcast encryption.

The foregoing description will focus primarily on the construction of $(n,k,r,t)$-exclusive set systems for different settings of the relevant parameters n,k,r,t . Once specified, these set systems can then be incorporated in a straightforward way in any apparatus for broadcast encryption in the subset-cover framework (or in any apparatus for multi-certificate validation as discussed in the work of Aiello et al. [1]).

TECHNIQUES. In some embodiments, we first construct exclusive set systems for the case when r and t are much smaller than n. Then, exclusive set systems for general n,r, and t are constructed with a divide-and-conquer approach: roughly speaking, we partition the universe [n] into blocks and use our smaller set systems independently on each block.

The construction for small r,t is algebraic in nature. Namely, we associate [n] with points in affine space. Sets then correspond to functions $f$ on this space. More precisely, a set corresponds to the points on which $f$ does not vanish. An exclusive set system then corresponds to a set of functions. A cover of the set of privileged users corresponds to a set of t functions (say, $f_0, \ldots, f_{t-1}$). Then a point u belongs to the broadcast (i.e. is a privileged user) provided it does not vanish on all the t functions $f_0, \ldots, f_{t-1}$ in the broadcast. Algebraically, this means that u is not in the variety of $f_0, \ldots, f_{t-1}$. The main problem is to find a small explicit collection of functions $f$ for which every set R of at most r points is the variety of some t functions $f_0, \ldots, f_{t-1}$ in the collection. To keep the collection small, we use multivariate polynomials in a novel way, together with various other algebraic tools known by those well versed in the art, including certain expanders and MDS codes (Maximum Distance Separable codes).

2 Constructing Exclusive Set Systems Using Polynomials

Some embodiments of the system of the present invention are run on a server computer system 610 (FIG. 7) and a client computer system 620 which communicate with signals transmitted over a network 624. Systems 610 and 620 can be replaced with any systems, not necessarily client and server. Server 610 contains one or more computer processors 730 executing computer instructions. Server 610 also contains computer storage 734 (semiconductor memory, magnetic or optical disks, and/or other types of storage) to store instructions and data. Client 620 contains one or more processors 740 to execute computer instructions, and storage 744 to store instructions and data. The client and the server may also contain other equipment as needed.

We start by describing a simplified method under a choice for the parameters wherein:

$$r^\alpha t^2 \leq n^{1/t} \quad (1)$$

for a constant $\alpha > 2$ to be specified. The reason for this choice will become clear in the foregoing description.

Let $$p \geq n^{1/t} \quad (2)$$

be prime, and let $F = F_p$. For $x \in [n]$, we identify x with a point $(x_0, \ldots, x_{t-1}) \in F^t$, i.e. we define an injective mapping:

$$A(x) = (x_0, \ldots, x_{t-1}) \in F^t \quad (3)$$

Since the points of [n] are thus identified with points in $F^t$, we will sometimes speak of x as a point in $F^t$, and write $x = (x_0, \ldots, x_{t-1})$.

Our method works by choosing a collection CF of polynomials in $x_0, \ldots, x_{t-1}$, which can be thought of as polynomials in the ring $F[X_0, \ldots, X_{t-1}]$ which are evaluated on $(X_0, \ldots, X_{t-1}) = (x_0, \ldots, x_{t-1})$, where $X_0, \ldots, X_{t-1}$ are formal variables. If $f(X_0, \ldots, X_{t-1})$ is such a polynomial, then we will define $f(x)$ as:

$$f(x) = f(x_0, \ldots, x_{t-1}) \quad (4)$$

At set-up step 750, for each $f \in CF$, the server 610 determines a set $S_f$ consisting of all the points u in $F^t$ for which $f(u) \neq 0$. At step 760, for each set $S_f$, the server generates the corresponding data $k_{S_f}$ (see FIG. 3). At step 770, for each client x (i.e. each client 620), the server determines all the sets $S_f$ containing x, and sends the corresponding data $$k_{S_f}$$

to the client over the network 624. In some embodiments, these transmission are done via secure channels, using prior art techniques.

Figure 4A:
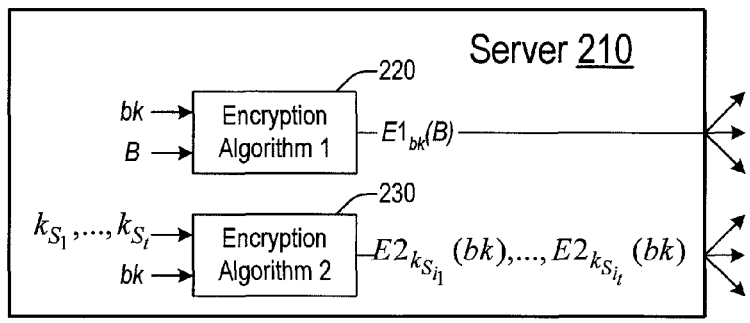
FIG. 4A illustrates a prior art server performing a broadcast encrypted once for each of sets of non-revoked client.
Figure 4B:
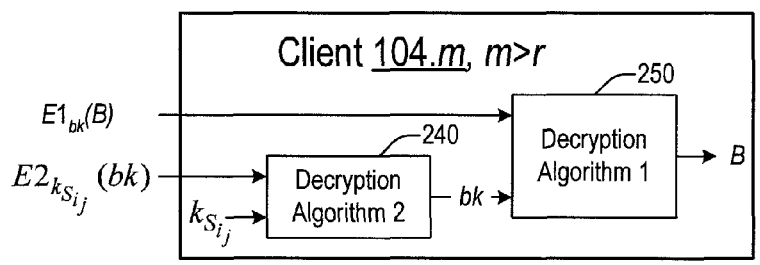
FIG. 4B illustrates prior art clients receiving a broadcast performed as in FIG. 4A.
Figure 5:
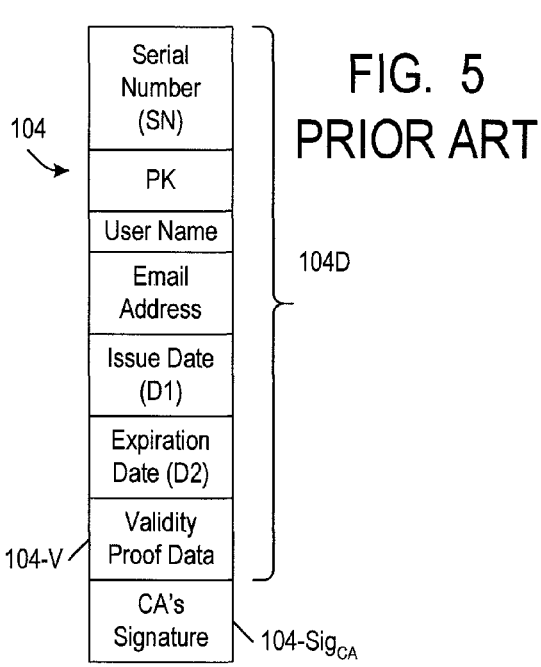
FIG. 5 illustrates a prior art digital certificate.
Figure 6A:
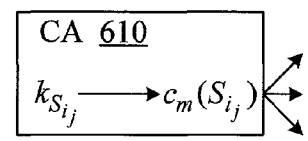
FIG. 6A illustrates a prior art certificate authority (CA) transmitting proofs of certificate validity.
Figure 6B:
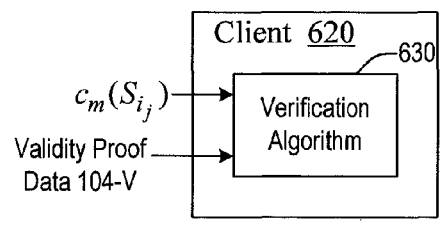
FIG. 6B illustrates a prior art client verifying a proof of certificate validity.

The broadcasts are performed as in FIGS. 4A, 4B. FIG. 7 illustrates how the server 610 determines the set cover $$\{S_{i_j}\}$$

of t sets or fewer. Given the set $R \subset [n]$ with $|R| \leq r$, the server finds at step 810 a set SF(R) of at most t functions $f_0, \ldots, f_{t-1} \in CF$ for which $Var(f_0, \ldots, f_{t-1}) = R$, where $Var(f_0, \ldots, f_{t-1})$ denotes the common zeros of $f_0, \ldots, f_{t-1}$, that is, the variety of these functions. By construction, any $u \in [n] \setminus R$ occurs in some set, while any $u \in R$ does not. At step 820, the server determines $$k_{S_f}$$

for each function $f$ in SF(R), and performs the broadcast as in FIG. 4A. Each non-revoked client 620 decrypts the broadcast as in FIG. 4B.

The problem is therefore to find an explicit polynomial collection CF with the properties (1). Consider first the following collection $CF_1$:

$$CF_1 = \left\{ \prod_{j=1}^{r'} (X_0 - i_j) \,\middle|\, 0 \leq r' \leq r, \text{ distinct } i_1, \ldots, i_{r'} \in F \right\} \quad (5)$$

$$\cup \{g(X_{i-1}) - X_i \mid 1 \leq i \leq t-1, \deg(g) \leq r-1\}.$$

By convention herein, the product of zero terms is equal to 1, so $$\prod_{j=1}^{0} (X_0 - i_j) = 1$$

Hence, $CF_1$ includes the constant polynomial $f \equiv 1$, i.e. CC includes the set [n].

It should be apparent to one versed in the art that the number of polynomials of the form $$\prod_{j=1}^{r'} (X_0 - i_j) \text{ is} \quad (6)$$

$$\sum_{i=0}^{r} \binom{p}{i} \leq \sum_{i=0}^{r} p^i = \frac{p^{r+1} - 1}{p - 1} \leq 2p^r,$$

and the number of univariate polynomials g of degree at most r−1 is at most $p^r$. Hence, the size of $CF_1$ is $O(tp^r)$.

Intuition: Before proceeding, we provide some intuition behind the scheme. The idea we use is that polynomials of the form $f_i = g(X_{i-1}) - X_i$, where $i > 0$, implement a Boolean AND operation between adjacent coordinates. More particularly, denote the points of R as $u^{(1)}, u^{(2)}, \ldots$ (see FIG. 9). For each $j \leq |R|$, denote $$u^{(j)} = (u_0^{(j)}, u_1^{(j)}, \ldots, u_{t-1}^{(j)}). \quad (7)$$

Then each polynomial $f_i(i>0)$ imposes constraints on the adjacent coordinates $u_{i-1}, u_i$ as defined by the set R. Each of these polynomials has degree at most r−1, so we can only use a given polynomial to implement r constraints. By chaining t of the polynomials together, we can exclude exactly those points in R, coordinate by coordinate. Finally, we need polynomials in $u_0$ of the form $$f_0(X_0) = \prod_{j=1}^{r'} (X_0 - i_j)$$

for the base case, that is, to begin the chaining. These degree-r polynomials impose constraints on the $u_0$ coordinates. One important observation is that by using polynomials to implement these local constraints, we greatly reduce the total number of sets k. The reason is that the mapping from sets of r constraints to polynomials is many-to-one.

We first consider the situation that for each i in [t], no two points in R have the same ith coordinate. (By convention herein, in (3), the ith coordinate is $x_{i+1}$, i.e. the coordinates are numbered beginning with 1.) For example, for t=4, R may consist of three points (1,2,2,4), (2,1,4,3), and (5,6,7,8).

We now describe the formal method for finding the functions $f_0, \ldots, f_{t-1}$ of the set SF(R) (FIG. 7) in this circumstance. Since the coordinates have distinct values and $|R| \leq r$, we can choose $$f_0 = f_0(X_0, \ldots, X_{t-1}) = \prod_{u=(u_0,\ldots,u_{t-1}) \in R} (X_0 - u_0) \quad (8)$$

Clearly, $f_0 \in CF_1$ as defined by (5). Now, for each fixed $i=1, \ldots, t-1$, we find a polynomial $g_i \in F[X]$ by interpolating from $$g_i(u_{i-1}) = u_i \text{ for each } u=(u_0, \ldots, u_{t-1}) \in R \quad (9)$$

More particularly (see FIG. 9):

$$g_i(X) = \sum_j u_i^{(j)} \frac{\prod_{s \neq j}(X - u_{i-1}^{(s)})}{\prod_{s \neq j}(u_{i-1}^{(j)} - u_{i-1}^{(s)})} \quad (10)$$

We set:

$$f_i = g_i(X_{i-1}) - X_i \quad (11)$$

Clearly, the functions $f_0, \ldots, f_{t-1}$ vanish on R. Conversely, for any point $x \notin R$, at least one of these functions does not vanish on x. Indeed, if $x=(x_0, \ldots, x_{t-1}) \in \text{Var}(f_0, \ldots, f_{t-1})$, then $f_0(x_0)=0$, so that $x_0=u_0$ for some $u=(u_0, \ldots, u_{t-1}) \in R$. For that u, since $g_i(u_{i-1})=u_i$, it inductively follows that $u_i=g_i(u_{i-1})=g_i(x_{i-1})=x_i$, showing that x=u, which would be a contradiction. Therefore, it follows that if $x \notin R$, then $x \notin \text{Var}(f_0, \ldots, f_{t-1})$, which is the desired condition.

The above construction serves as a proof of the following lemma.

Lemma 1. Suppose that for each i in [t], no two points in R have the same ith coordinate.

Then we can find $(f_0, \ldots, f_{t-1}) \in CF_1$ for which $\text{Var}(f_0, \ldots, f_{t-1})=R$.

Clearly, each $f_0$ depends only on $X_0$, and has degree r. Each $f_i(i>0)$ depends only on $X_{i-1}, X_i$, and is a sum of a polynomial $g_i(X_{i-1})$ depending only on $X_{i-1}$ and having degree at most $|R|-1$ (or 0 if r=0), and a polynomial $(-X_i)$ depending only on $X_i$ and having degree $|R|$.

Let $CC_1$ denote the collection of the sets $S_f$ corresponding to the polynomials in $CF_1$. Then the expressions (8) and (11) correspond, respectively, to the following elements of $CC_1$:

$$S_{f_0}=S_{f_0}(R)=\{x \in [n] | x_0 \neq u_0 \text{ for each } u \in R\}$$

$$S_{f_i}=S_{f_i}(R)=\{x \in [n] | g_i(x_{i-1}) \neq x_i\}, i=1, \ldots, t-1 \quad (12)$$

$CC_1$ is thus the set of all subsets $S_{f_i}(R)(i=0, \ldots, t-1)$ for all R such that $|R| \leq r$. In other words, $CC_1$ consists of all the sets S of the form:

$$S=\{x \in [n] | x_0 \notin \{i_1, \ldots, i_{r'}\}\}, \text{ where } 0 \leq r' \leq r, i_1, \ldots, i_{r'} \in F, \text{ or}$$

$$S=\{x \in [n] | g(x_{i-1}) \neq x_i\}, \text{ where } g \in F[X], \deg(g) \leq r-1. \quad (13)$$

The construction of Lemma 1 can be extended to the case when points in R share coordinates. One idea is to carefully choose a small set of invertible linear transformations $L_1, \ldots, L_m$:

$$L_B: F^t \to F^t$$

so that for any set R, there is some index B for which the points of $L_B R$ do not share coordinates, i.e. each row of $L_B R$ consists of distinct entries. Here, $L_B$ is interpreted as a t×t matrix and R as a t×r matrix. Each such linear transformation L defines a new coordinate system, i.e. a new way to represent each element $x \in F$ with t elements of $F^t$:

$$Lx=(Lx_0, \ldots, Lx_{t-1}) \quad (14)$$

where $$Lx_i = \sum_{j=0}^{t-1} L(i, j) x_j$$

where $x_j$ are coordinates of x in coordinate system (3), and $L(i,j)$ is the element in the ith row and jth column of L (the rows and columns are numbered starting with 0). Likewise, if $X=(X_0, \ldots, X_{t-1})$ is a vector of formal variables, then we define $$LX_i = \sum_{j=0}^{t-1} L(i, j) X_j$$

Given an index B such that the points of $L_B R$ do not share coordinates, we can proceed as in (5)-(13) in this new coordinate system. In this case we say that $L_B$ is good for R. By analogy with (5), we define CF to be $\cup_B CF_B$, wherein for each B, $CF_B$ is given by $$CF_B = \left\{ \prod_{j=1}^{r'} (L_B X_0 - i_j) \,\middle|\, 0 \leq r' \leq r, \text{ distinct } i_1, \ldots, i_{r'} \in F \right\} \quad (15)$$

$$\cup \{g(L_B X_{i-1}) - L_B X_i | 1 \leq i \leq t-1, g \in F[X], \deg(g) \leq r-1\}.$$

The size of CF is $O(mtp^r)$.

Step 810 (FIG. 8) is performed as follows. For a given R with $|R| \leq r$, we find an index B for which $L_B$ is good for R, and then apply the previous scheme (expressions (5)-(13)) using the sets in $CF_B$. The polynomial set SF(R) will consist of the polynomials $f_0, \ldots, f_{t-1}$ constructed as follows (see ((8)-(11)):

$$f_0 = f_{0,R}(X_0, \ldots, X_{t-1}) = \prod_{u \in R}(L_B X_0 - L_B u_0) \quad (16)$$

For each fixed $i=1, \ldots, t-1$, we find a polynomial $g_{i,R} = g_i \in F[X]$ by interpolating from $$g_i(L_B u_{i-1}) = L_B u_i \text{ for each } u = (u_0, \ldots, u_{t-1}) \in R \quad (17)$$

This is possible because all $L_B u_{i-1}$ are distinct. More particularly, denote the points of R as $u^{(1)}, u^{(2)}, \ldots$. For each $j \leq |R|$, denote $$u^{(j)} = (u_0^{(j)}, u_1^{(j)}, \ldots, u_{t-1}^{(j)}). \quad (18)$$

Then:

$$g_i(X) = \sum_j L_B u_i^{(j)} \frac{\prod_{s \neq j}(X - L_B u_{i-1}^{(s)})}{\prod_{s \neq j}(L_B u_{i-1}^{(j)} - L_B u_{i-1}^{(s)})} \quad (19)$$

We set:

$$f_i = f_{i,R} = g_i(L_B X_{i-1}) - L_B X_i \quad (20)$$

For a given B, let $CC_B$ denote the collection of the all sets $S_f$ corresponding to the polynomials $f \in CF_B$. Then the expressions (16) and (20) correspond, respectively, to the following elements of $CC_B \subset CC$:

$$S_{f_0} = S_{f_0}(R) = \{x \in [n] | L_B x_0 \neq L_B u_0 \text{ for each } u \in R\}$$

$$S_{f_i} = S_{f_i}(R) = \{x \in [n] | g_i(L_B x_{i-1}) \neq L_B x_i\}, i=1, \ldots, t-1 \quad (21)$$

$CC_B$ is thus the set of all subsets $S_{f_i}(R)$ ($i=0, \ldots, t-1$) for all R such that $|R| \leq r$. CC can be chosen as the collection of all the sets S of the form (22) below for all B:

$$S = \{x \in [n] | L_B x_0 \notin \{i_1, \ldots, i_{r'}\}\}, \text{ where } 0 \leq r' \leq r, \text{ distinct } i_1, \ldots, i_{r'} \in F, \text{ or}$$

$$S = \{x \in [n] | g(L_B x_{i-1}) \neq x_i\}, \text{ where } g \in F[X], \deg(g) \leq r-1\}. \quad (22)$$

Of note, at step 750, the server can use the expression (13) or (22) directly without considering polynomials. See FIG. 10. At step 750 of FIG. 10, the server receives the parameters n, r, t and defines an (n,k,r,t)-exclusive set system CC such that at least one element of CC is the set $S_f$ corresponding to a polynomial $f(x) \in F[X_0, \ldots, X_{t-1}]$ of degree exactly r. CC may contain other sets $S_f$ corresponding to polynomials $f(x) \in F[X_0, \ldots, X_{t-1}]$ of degree less than r. Also, the system CC may contain additional sets S not representable as sets on which a polynomial of a degree at most r is not zero. In any case, at step 760 (FIG. 10), the server defines the data $k_S$ for the sets $S \in CC$. At step 770, for each client x, the server determines all the sets S containing x, and sends the corresponding data $k_s$ to the client over a secure channel.

During the broadcast (FIG. 11), the server accepts a description of the revoked set R and finds a cover for R. If R is not empty, the cover contains a set $S_f$ corresponding to a polynomial $f(x) \in F[X_0, \ldots, X_{t-1}]$ of degree $|R|$. The set R may have any cardinality up to r, where r can be any predefined number, possibly greater than 1.

To complete the specification, we specify an explicit set of $m = r^t$ linear transformations $L_1, \ldots, L_m$ such that for all $R \subset [n]$ of size at most r, there is some $L_B$ that is good for R.

Figure 12:
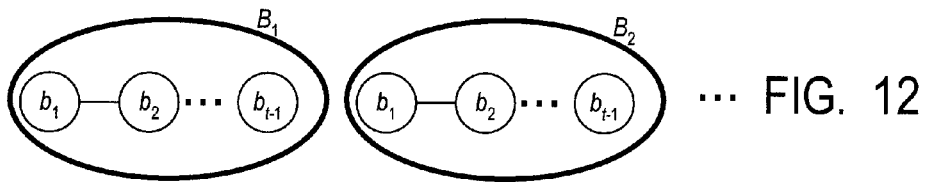
FIGS. 12 and 13 illustrate data structures according to some embodiments of the present invention.

To do so, we first define $m = r^2 t$ disjoint blocks $B_1, \ldots, B_m$, wherein each of these blocks B consists of some elements $b_1, \ldots, b_t$ in F. See FIG. 12, where the elements of F are represented as circles in a two-dimensional plane. It should be recognized that such choice of blocks B is possible because, as seen from (1), (2), $r^2 t^2 \leq n^{1/t} \leq p$. The blocks can be defined in an arbitrary way. For example, we can define $B_1 = \{0, \ldots, t-1\}$, $B_2 = \{t, \ldots, 2t-1\}$, and so on. Then define the linear transformations:

$$L_B = \begin{bmatrix} 1 & b_0 & b_0^2 & \ldots & b_0^{t-1} \\ 1 & b_1 & b_1^2 & \ldots & b_1^{t-1} \\ \ldots & \ldots & \ldots & \ldots & \ldots \\ 1 & b_{t-1} & b_{t-1}^2 & \ldots & b_{t-1}^{t-1} \end{bmatrix}. \quad (23)$$

(We sometimes use the blocks B as indices instead of numbers 1 through m.) The $L_B$ are invertible. For each $b, x \in F$, we define $$p_x(b) = \sum_{i=0}^{t-1} x_i b^i. \quad (24)$$

Then $$L_B(x) = (p_x(b_0), \ldots, p_x(b_{t-1})) \quad (25)$$

Clearly, each $p_x(b)$ is a polynomial of degree at most $t-1$ in b and is linear in each of $x_0, \ldots, x_{t-1}$.

As two distinct polynomials of degree $t-1$ can agree on at most $t-1$ points, it follows that for any given R, at most $$\binom{r}{2}(t-1) < r^2 t$$

blocks of t elements each can be such that $p_x(v) = p_y(v)$ for some v in a block for distinct $x, y \in R$. Therefore, one of the $L_B$ is good for R.

For this choice of $L_B$, we can re-write (15) as follows. We represent each $CF_B$ as $$CF_B = CF_{B0} \cup CF_{B1}, \quad (26)$$

where:

$$CF_{B0} = \left\{ \prod_{j=1}^{r'} \left( \sum_{s=0}^{t-1} b_0^s X_s - i_j \right) \middle| 0 \leq r' \leq r, \text{ distinct } i_1, \ldots, i_{r'} \in F \right\} \quad (27)$$

-continued $$CF_{B1} = \left\{ g\left(\sum_{s=0}^{t-1} b_{i-1}^s X_s\right) - \sum_{s=0}^{t-1} b_i^s X_s \,\middle|\, 1 \le i \le t-1; g \in F[X], deg(g) \le r-1 \right\} \quad (28)$$

Here $b_0, b_{i-1}, b_i$ are elements of the block B corresponding to $CF_B$.

Of note, expressions (15) through (28) are also appropriate for the case when no two points in R have the same ith coordinate for all i, i.e. the case considered above in connection with expression (8). Indeed, one of $L_B$'s will be good for any such R.

The above construction serves as a proof of the following mathematical lemma:

Lemma 2. There is an explicit set of $m=r^2t$ linear transformations such that for all $R \subset [n]$ of size at most r, one of the transformations is good for R.

By Lemma 2 we can set $m=r^2t$ in the discussion above. Thus $k=O((rt)^2 p^r)$. Using a standard result in the art [2], we can find a prime p with $n^{1/t} \le p < n^{1/t} + n^{\beta/t}$ for any constant $\beta > 0.525$ and sufficiently large $n^{1/t}$. Since $t \le n^{1/t}$, we have $$t = O\left(\frac{\log n}{\log \log n}\right),$$

and thus $$n^{1/t} = \Omega\left(\frac{\log n}{\log \log n}\right).$$

Therefore we can find such a prime for sufficiently large n. The number of keys is bounded by $$O((rt)^2 p^r) = O((rt)^2 (n^{1/t} + n^{\beta/t})^r) = O((rt)^2 n^{r/t} (1 + n^{(\beta-1)/t})^r)$$

$$= O((rt)^2 n^{r/t} e^{r/n^{(1-\beta)/t}}) = O((rt)^2 n^{r/t}),$$

provided that (for the last equality) $r=O(n^{(1-\beta)/t})$, or $r^{1/(1-\beta)}=O(n^{1/t})$. The time for broadcasting is dominated by the search for a good $L_B$ and the $t-1$ degree-$(r-1)$ polynomial interpolations, each of which can be done in poly(r, t, log n) time.

The performance characteristics of the exclusive set system can be summarized in the following theorem (in which α can be thought of as $1/(1-\beta)$:

Theorem 3. Let $$\alpha > \frac{1}{1-.525} = 40/19$$

be any constant, and assume $\max(r^\alpha, r^2 t^2) = O(n^{1/t})$. For sufficiently large n, there is an explicit (n, $O((rt)^2 n^{r/t})$,r,t)-exclusive set system. Further, broadcasting can be done in poly(r, t, log n) time.

3 Constructing Exclusive Set Systems Using Graphs

We can improve on the previous method with a slightly different way of handling points in R that share coordinates.

Intuition: The previous method had $r^2 t$ coordinate systems defined by the transformations $L_B$, each of which was good for a different collection of $R \subset [n]$. In each system we interpreted a point $x \in F^t$ as a polynomial $p_x$, and evaluated the polynomial on t elements $b_1, \ldots, b_t$ of F. The system $L_B$ corresponding to $b_1, \ldots, b_t$ was good for R if for each of the t elements $b_1, \ldots, b_t$ each of the at most r polynomials $p_x$, corresponding to the points in R had different evaluations. The disadvantage is that even if only two polynomials collided on just one element $b_i$, the coordinate system could not be used for R. In the worst case this happens less than $r^2 t$ times, so we used $r^2 t$ systems, formed using $r^2 t^2$ elements $b_i$ of F.

But given a set R of r points corresponding to r polynomials, only some number less than $r^2 t$ of elements $b_i$ of F can have collisions on these polynomials. If we had $r^2 t+t$ elements $b_i$, for any R we could find t elements $b_i$ to use for a coordinate system $L_B$. However, if we allow any two elements to occur together in a system, the number of sets (i.e., the number of polynomial constraints) needed would be too large. Interpreting the elements $b_i$ as nodes of a graph and pairs of elements that can occur together as edges, the property we want is that the graph is well-connected (i.e. has many paths from one node to another) and has low degree. This is exactly the property of an expander graph. We will find a connected component of size t amongst collision-free elements and use this as a coordinate system.

Figure 13:
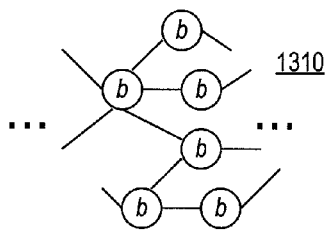

We will identify the points of [n] with vertices b of a graph G=(V,E). The graph is shown at 1310 in FIG. 13. Here V is the set of vertices, and E is the set of edges. A set of polynomials similar to (28) will be constructed for each pair of adjacent vertices, and another set similar to (27) for each vertex. More particularly:

$$CF = \left\{ \prod_{j=1}^{r'} \left( \sum_{i=0}^{t-1} b^i X_i - i_j \right) \,\middle|\, 0 \le r' \le r, \text{ distinct } i_1, \ldots, i_{r'} \in F, b \in V \right\} \quad (29)$$

$$\cup \left\{ g\left(\sum_{i=0}^{t-1} b^i X_i\right) - \sum_{i=0}^{t-1} c^i X_i \,\middle|\, g \in F[X], deg(g) \le r-1, (b,c) \in E \right\}.$$

CF corresponds to the exclusive set system CC which contains all the sets S of the form:

$$S = \left\{ x \in [n] \,\middle|\, \sum_{i=0}^{t-1} b^i x_i \notin \{i_1, \ldots, i_{r'}\} \right\}, \quad (30)$$

where $0 \le r' \le r$, distinct $i_1, \ldots, i_{r'} \in F, b \in V$, or $$S = \left\{ x \in [n] \,\middle|\, g\left(\sum_{i=0}^{t-1} b^i x_i\right) \ne \sum_{i=0}^{t-1} c^i x_i \right\},$$

where $g \in F[X], deg(g) \le r-1, (b,c) \in E$.

At step 750 (FIG. 7 or 10), the server obtains an appropriate graph G, and constructs the exclusive set system (30), possibly from polynomials (29).

Figure 14:
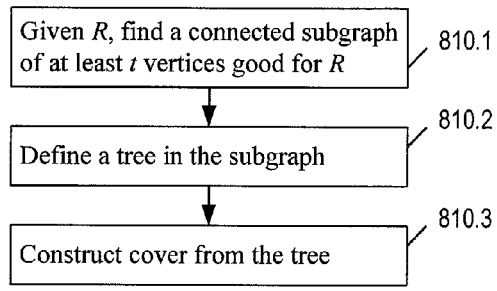
FIG. 14 is a flowchart for constructing a set cover according to some embodiments of the present invention.
Figure 15:
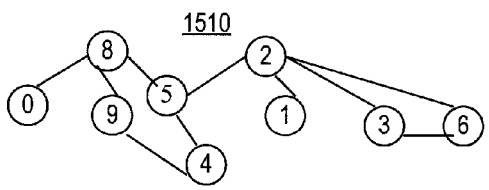
FIGS. 15 and 16 illustrate data structures according to some embodiments of the present invention.
Figure 16:
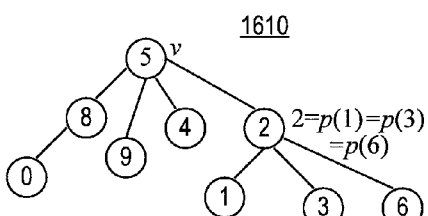

Step 810 (FIG. 8 or 11) is performed as shown in FIG. 14. We will say that an element v is good for a set R if, using the notation of Lemma 2, for any distinct x, y∈R, $p_x(v) \neq p_y(v)$. We assume $|R| \geq 2$, since the step 810 is trivial for the case |R| being 0 or 1. Given a revoked set R, at step 810.1 the server finds a connected subgraph (FIG. 15) of at least t vertices that are good for R. This can be done using techniques described below. FIG. 15 shows an example subgraph 1510 of 9 vertices (t=9) labeled with integers for ease of reference. At step 810.2, the server defines a tree 1610 (FIG. 16) which is a subgraph of the subgraph 1510. This means that the server defines, in storage 734, the parent-child relationship among the nodes. Any such tree will do, and in some embodiments the tree is constructed using a graph traversal similar to a breadth-first search (BFS). (The server does not do a search however.) More particularly, a queue (not shown) is defined in the server's storage 734. Then (see FIG. 17):

1. At step 1710, a node is picked for a root of the tree (node 5 in FIG. 16; we use "node" and "vertex" interchangeably), and put in the queue. This can be any node in the graph. The server also marks the node to indicate that it has been in the queue during this processing.

2. At step 1720, a node is dequeued from the queue (this will be node 5 in our example). Take all the unmarked nodes adjacent to this node in the subgraph 1510 (nodes 8, 9, 4, 2 in our example), and add them to the queue (in any order) and mark them. Make these nodes to be the children of the pulled node in the tree (nodes 8, 9, 4, 2 are children of 5 in FIG. 16).

Repeat step 1720 until the queue is empty (as shown by steps 1724, 1730). Thus, the next node to be pulled from the queue will be 8, and its adjacent node 0 will become its child in the tree. It will also be added to the queue and marked, and so on.

We note that a tree 1610 is roughly analogous to a transformation $L_B$ of (23). The tree has t nodes, similar to the elements $b_0, \ldots, b_{t-1}$ of the block B. By analogy with the coordinate system of (25), each element x∈F can be represented by a set of values of $p_x$ on the tree nodes:

$$\{p_x(b) \mid b \text{ is a node of tree } 1610\} \tag{31}$$

Each node b in the tree corresponds to one of the coordinates in the coordinate system (31).

By analogy with (5)-(28), we can construct t polynomials $\{f_b \mid b \text{ is a node of tree } 1610\}$ for SF(R), one polynomial for each coordinate. The server performs this operation at step 810.3. Let v be the root of the tree (node 5 in FIG. 16). For any other vertex b in the tree, let p(b) be its parent. The polynomial $f_v$ will impose constraints on the vth coordinate. Every other polynomial $f_b$ will impose constraints on the pair of b and p(b). More particularly, the server sets $$f_v = \prod_{u \in R} \left( \sum_{i=0}^{t-1} v^i X_i - p_u(v) \right) \tag{32}$$

For each b≠v, the server finds a polynomial $g_b$ of degree at most |R|−1 by interpolating from $$g_b\left(\sum_{i=0}^{t-1} p(b)^i u_i\right) = \sum_{i=0}^{t-1} b^i u_i \text{ for all } u = (u_0, \ldots, u_{t-1}) \in R, \tag{33}$$

i.e., $$g_b(p_u(p(b))) = p_u(b) \text{ for all } u \in R, \tag{34}$$

and sets $$f_b = g_b\left(\sum_{i=0}^{t-1} p(b)^i X_i\right) - \sum_{i=0}^{t-1} b^i X_i \tag{35}$$

We show now that Var($\{f_b\}$)=R. Indeed, in view of (34), every u∈R vanishes on these t functions $\{f_b\}$ (i.e. the functions are zero on R). It will be apparent to one skilled in the art after reviewing the foregoing argument that no other point x∈F vanishes. Indeed, let us assume the contrary, i.e. that a point x∈F\R vanishes on all $f_b$. Then $$f_v\left(\sum_{i=0}^{t-1} v^i x_i\right) = 0,$$

so (32) implies that $$\sum_{i=0}^{t-1} v^i x_i = p_u(v)$$

for some u∈R since $f_v$ has only |R| zeros. In other words, $p_x(v)=p_u(v)$. Denote this particular u as uu. Proceeding inductively on the height of the tree starting from the root, we see that $$p_x(b) = p_{uu}(b) \tag{36}$$

for all vertices b in the tree. Indeed, suppose p(b)=c, and assume that (36) has been proven for this parent node c, i.e. $p_x(c)=p_{uu}(c)$. Then, since $f_b$ vanishes on uu and x, we obtain from (35):

$$g_b(p_{uu}(c)) = p_{uu}(b), \text{ and } g_b(p_x(c)) = p_x(b),$$

and hence (36) holds for the node b. Thus, (36) holds for all the t vertices. Since $p_x$, $p_{uu}$ are degree-(t−1) polynomials, $p_x = p_{uu}$, so x=uu, a contradiction.

The invention is not limited to particular graphs or to embodiments in which the number |CF| of polynomials is smaller than in the case of FIG. 10. However, we show now how a graph of FIG. 13 can be chosen to obtain a small |CF|. Choose m=$\gamma r^2 t$ elements (say, 1, . . . , m) in F, where γ>2 is a constant to be determined. From the proof of Lemma 2, for any R we can find $(\gamma-1)r^2 t$ good elements for R.

The idea is to consider graphs G with constant degree d, vertex set [m], and the property that any induced subgraph on a large constant fraction of vertices has a connected component of size at least m/2≧t. This property holds for certain expander graphs. Recall that a graph G=(V,E) with the vertex set V and the edge set E is an (m,d,c)-expander if it has m-vertices, each vertex has degree d, and for every set of vertices W ⊂ V with |W|≦m/2, there are at least c|W| vertices in V\W adjacent to some vertex in W.

Consider an (m,d,c)-expander G. It will be apparent to one skilled in the art after reviewing the foregoing argument that any induced subgraph H on more than $$\frac{dm}{c+d}$$

vertices has a connected component of size at least m/2. Specifically, let $C_1, \ldots, C_k$ be the connected components of H. Now, G is an expander and if $|C_i| < m/2$ for all $1 \leq i \leq k$, then $C_i$ is incident to at least $c|C_i|$ distinct vertices in $G \backslash C_i$, and thus in $G \backslash H$. Therefore, the multiset of vertices in $G \backslash H$ connected to H has cardinality more than $$c \frac{dm}{c+d},$$

which is impossible since each of the (at most)

$$m - \frac{dm}{c+d} = \frac{cm}{c+d}$$

vertices in $G \backslash H$ can occur at most d times. It follows therefore, that at least one connected component has $m/2 \geq t$ vertices. The above argument proves the following lemma:

Lemma 4. Let G be an (m,d,c)-expander. Then any induced subgraph on more than $$\frac{dm}{c+d}$$

vertices of G has a connected component of size at least m/2.

Now, there are many known constructions in the art of expander graphs with desirable parameters. In particular, some of the methods described in the present disclosure will make use of such known constructions. For an explicit family of expanders, we use the following.

Fact 5 (See [10]). There is an explicit family of $$\left(m_i, 6, \frac{1}{2} - \frac{\sqrt{5}}{6}\right)$$

expanders with $m_i < m_{i+1} < m_i(1+o(1))$.

In some embodiments, we use a graph G (for the graph of FIG. 13) that satisfies the conditions summarized in Lemma 4. Given R, the server can find $(\gamma-1)r^2t$ vertices good for R, and in order for the corresponding induced subgraph to have a component of size m/2 as guaranteed by Lemma 4, we want that:

$$(\gamma-1)r^2t > \frac{dm}{c+d} \tag{37}$$

We use Fact 5 to construct an $$\left(m = \gamma r^2 t, 6, \frac{1}{2} - \frac{\sqrt{5}}{6}\right)$$

expander. This value of m belongs to the set $\{m_i\}$ as in Fact 5. With this value of m, (37) becomes:

$$\frac{\gamma-1}{\gamma} > \frac{6}{6 + \frac{1}{2} - \frac{\sqrt{5}}{6}}. \tag{38}$$

or $$\gamma > \frac{39 - \sqrt{5}}{3 - \sqrt{5}} \tag{39}$$

(for example, γ can be 49 or greater). At step 750 (FIG. 7 or 10), the server identifies G=(V,E)'s vertices V with [m] ⊂ F, and defines CC as in (30). The size of CF as defined in (29), and thus k, is $O(mdp^r)$. As was apparent in the argument leading up to Theorem 3, we can choose p so that this quantity is $O(r^2 t n^{r/t})$.

Step 810.1 (FIG. 14) is performed as follows. Given R, the server finds $(\gamma-1)r^2t$ vertices in G which are good for R. Then, the server finds a connected component C of at least $m/2 \geq t$ vertices good for R (note that our choice of γ and the argument leading up to Lemma 4 guarantees that such a connected component exists). The component C includes the subgraph 1510 (FIG. 15), and may include other nodes and edges.

Figure 17:
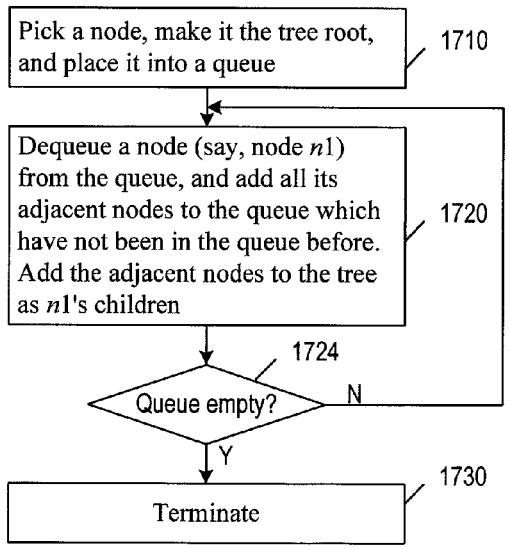
FIGS. 17 and 18 are flowcharts of methods used to construct set covers according to some embodiments of the present invention.

At step 810.2, the procedure of FIG. 17 is performed on the connected component C until the number of nodes in the tree 1610 reaches t (i.e. step 1720 is performed until the number of nodes in the tree reaches t). Then step 810.3 is performed as described above.

The time complexity is dominated by the search for good vertices for R, the tree generation (step 810.2), and the polynomial interpolations, all of which can be carried out in poly(r, t, log n) time using techniques known in the art.

The results from the above construction can be summarized by means of the following theorem.

Theorem 6. Let $$\alpha > \frac{1}{1 - .525}$$

be any constant, and assume $\max(r^\alpha, r^2 t) = O(n^{1/t})$. For sufficiently large n, there is an explicit (n, $O(r^2 t n^{r/t})$,r,t)-exclusive set system. Further, broadcasting can be done in poly(r, t, log n) time.

4. Randomized Method for Constructing Exclusive Set Systems

The main drawback of randomized constructions in the prior art [8] is that whenever we want to find $S_{i_1}, \ldots, S_{i_j}$ whose union is [n]\R, we need to solve an instance of Set-Cover. We removed this problem with the explicit construction above, and further achieved size $O(r^2 t n^{r/t})$ versus the $O(t^3 n^{r/t} \log n)$ complexity in [8], which held only for $r \leq t$.

We now describe a method to improve the complexity further to $O(rtn^{r/t})$ via a randomized construction. Although the construction is randomized, it does not suffer from the efficiency problems of [8]. Rather, broadcasting can still be done in poly(r, t, log n) time.

Intuition: The idea is to choose the set of m points b for the graph of FIG. 13 randomly from F. For a given R it then becomes unlikely that we will choose many points with collisions on R. We show this allows us to choose O(rt) points rather than $O(r^2 t)$.

Lemma 7. Let $\epsilon > 0$ and $\gamma > 1$ be any constants. Assume $r^2 t < n^{(1-\epsilon)/t}$, and choose a set of S of $m = 2\gamma rt/\epsilon$ elements uniformly at random from F. Then with probability $1 - n^{-\Theta(r)}$, for all R, the set S contains $2(\gamma-1)rt/\epsilon$ good elements for R. (As conventional, $\Theta(r)$ denotes a value Y such that the lower and upper limits of Y/r are positive and finite when r approaches infinity.)

Proof: Fix a revoked set $R \subseteq [n]$. For $s \in S$, let v be the probability that s is not good for R, that is, there exist distinct $x, y \in R$ for which $p_x(s) = p_y(s)$. For fixed $x \neq y$, we have $\Pr_s[p_x(s) = p_y(s)] \leq (t-1)/p$, and thus $$v \leq \binom{r}{2}(t-1)/p \leq r^2 t/n^{1/t} < n^{-\epsilon/t}$$

by the assumption of the lemma. The probability that more than $2rt/\epsilon$ elements of S are not good for R is bounded by $$\sum_{i=2rt/\epsilon}^{m} \binom{m}{i} v^i (1-v)^{m-i} \leq m 2^m v^{2rt/\epsilon} < 2^{2m} n^{-2r} = n^{-2r+2m/\log n}.$$

For any $n^{-\Theta(r)} \leq \delta < 1$, this is less than $\delta n^{-r}$ if $-2r+2m/\log n \leq -r + \log \delta/\log n$, or equivalently, $r \log n \geq 2m + \log 1/\delta$. By assumption, this holds for sufficiently large n because $m = O(rt)$ and $\delta > n^{-\Theta(r)}$, while $t = O(\log n/\log\log n)$ since $t < n^{1/t}$. Then the probability there exists an R for which more than $2rt/\epsilon$ elements of S are not good for R is less than $$\sum_{i=0}^{r} \binom{n}{i} \delta n^{-r} \leq n^{-\Theta(r)}.$$

In some embodiments, we use the set S as the vertex set of an $(m=2\gamma rt/\epsilon, 6, \frac{1}{2}-mt;epmrl;\sqrt{5}/\epsilon rlxmx$ expander (FIG. 13) as described earlier in Fact 5, with m being equal to some $m_i$ as in Fact 5. At step 810.1 (FIG. 14), the server finds $2(\gamma-1)rt/\epsilon$ vertices that are good for R. By Lemma 4, the corresponding induced subgraph has a connected component of size at least m/2 provided that $$2(\gamma-1)rt/\epsilon > dm/(c+d) = 12\gamma rt/[\epsilon(6+\frac{1}{2}-mt;epmrl;\sqrt{5}/\epsilon rlxmx)]$$

This inequality is equivalent to (38). Therefore, the connected component exists if $\gamma$ satisfies (39).

The size of the polynomial set CF corresponding to S is $O(mdp^r) = O(rtp^r)$. As was apparent in the argument leading up to Theorem 3, we can choose p so that this quantity is $o(rtn^{r/t})$. We conclude:

Theorem 8. Let $$\alpha > \frac{1}{1-.525}$$

and $\epsilon > 0$ be any constants, and assume $\max(r^\alpha, r^2 t) < n^{(1-\epsilon)/t}$. There is an efficient algorithm that with probability $1 - n^{-\Theta(r)}$, generates an $(n, O(rtn^{r/t}), r, t)$-exclusive set system. Further, broadcasting can be done in poly(r, t, log n) time.

6. Method for Balancing Key Complexity in Exclusive Set Systems

We have shown how to achieve complexity $k = O(rtn^{r/t})$. We now describe a method to achieve $$k = O\left(rt\binom{n}{r}^{1/t}\right).$$

To illustrate the technique, we first apply it to the scheme of Theorem 3. There are two types of sets $S_f$, those corresponding to polynomials of the form $$f = \prod_{j=1}^{r'} (L_B X_0 - i_j)$$

for $r' \leq r$ and distinct $i_1, \ldots, i_{r'} \in F$, and those corresponding to polynomials of the form $g(L_B X_{i-1}) - L_B X_i$, where g is a polynomial of degree at most $r-1$. If m is the number of linear combinations $L_B$, then the number of sets of the first type is $$m \sum_{r'=0}^{r} \binom{p}{r'}.$$

To apply Theorem 3, we assume $r^2 t^2 = O(n^{1/t})$, so that $r = O(p^{1/2})$. It follows that $$m \sum_{i=0}^{r} \binom{p}{i} = \Theta\left(m\binom{p}{r}\right).$$

(To see this, for any constant $$c, \binom{p}{c\sqrt{p}} / \binom{p}{c\sqrt{p-1}} = \Theta(\sqrt{p}),$$

so that $$\sum_{r'=0}^{c\sqrt{p}} \binom{p}{r'} = \binom{p}{c\sqrt{p}} + \sum_{r'=0}^{c\sqrt{p-1}} \binom{p}{r'} = \Theta\left(\binom{p}{c\sqrt{p}}\right);$$

in these equalities, a loose notation is used: $\sqrt{p}$ denotes an integer close to the real value of $\sqrt{p}$, e.g. the integer closest to the real value of $\sqrt{p}$). On the other hand, the number of sets of the second type is $m(t-1)p^r$.

Intuition: The complexity is dominated from sets of the second type. We will reduce the alphabet size p to some prime q, while including more alphabet symbols (other than just the first) in sets of the first type. This effectively balances the contribution to the complexity from the two types.

Using [2], for large enough n we can choose a prime q in the interval $$\left[\binom{n}{r}^{1/(rt)}, \binom{n}{r}^{1/(rt)} + \binom{n}{r}^{\beta/(rt)}\right], \text{ i.e.} \quad (40)$$

$$\binom{n}{r}^{1/(rt)} \leq q \leq \binom{n}{r}^{1/(rt)} + \binom{n}{r}^{\beta/(rt)}$$

for any constant $\beta > 0.525$. This follows if we assume $$\max(r^{1+\epsilon}, t) \leq n^{1/t} \quad (41)$$

for some constant $\epsilon > 0$. Indeed, this implies $n/r = n^{\Omega(1)}$ and $t = O(\log n/\log\log n)$, so $$\binom{n}{r}^{1/(rt)} \geq (n/r)^{1/t},$$

and the latter tends to $\infty$. We will show $k = O(mtq^r)$. Note that $$O(mtq^r) = O\left(mt\binom{n}{r}^{1/t}\right) \text{ for } r \leq \binom{n}{r}^{(1-\beta)/t}.$$

Since $$(n/r)^r \leq \binom{n}{r} \leq (ne/r)^r$$

(where e is the base of the natural logarithm), there is a constant $1 \leq c \leq e$, with $$\binom{n}{r} = (nc/r)^r. \quad (42)$$

We represent [n] by points in the (t+1)-dimensional space $$D = [\lceil r/c \rceil] \times F_q^t.$$

This allows elements of [n] to have distinct representations. Indeed, taking into account (40) and (42), $$|D| \geq (r/c) \times q^t \geq (r/c) \times \binom{n}{r}^{1/r} = n \quad (43)$$

Our exclusive set system CC will contain sets $S_f$ where each $f(X_0, X_1, \ldots, X_t)$ is independent of $X_0$ and is a polynomial in the space $F[X_1, \ldots, X_t]$ of degree at most r-1. In addition, CC will contain sets $S_R$ defined below.

For the moment, assume our revoked set R is such that no two members of R share their ith coordinate for any i>1 (i.e. for any coordinate corresponding to $F_q^t$). The set R corresponds to a set $S_R$ of the first type, and in particular the set of those points $x = (x_0, x_1, \ldots, x_t)$ whose first two coordinates $(x_0, x_1)$ do not agree with those of any element of R, i.e.

$$S_R = \{x = (x_0, x_1, \ldots, x_t) \in D | (x_0, x_1) \neq (u_0, u_1) \text{ for all } (u_0, u_1, \ldots, u_t) \in R\}. \quad (44)$$

Note that $S_R$ is similar to $S_{f_0}$ of (12). No representation is being made as to whether or not the set $S_R$ corresponds to a polynomial of degree at most r.

Since no two members of R share their ith coordinate for any i>1, the number of sets $S_R$ for all R such that $|R|$ is some fixed number $$r' \leq r \text{ is } \lceil r/c \rceil^{r'} \binom{q}{r'}.$$

Hence, the total number of sets $S_R$ is $$\sum_{r'=0}^{r} (\lceil r/c \rceil)^{r'} \binom{q}{r'} = \Theta\left((\lceil r/c \rceil)^r \binom{q}{r}\right),$$

since the fact that $$r \leq \binom{n}{r}^{(1-\beta)/t}$$

(at least when r is sufficiently large) implies that $r = O(\sqrt{q})$, so that the binomial sum is dominated by the last term.

Sets of the second type correspond to the polynomial collection:

$$CF_2 = \{g(X_{i-1}) - X_i | g \in F_q[X], 2 \leq i \leq t, \deg(g) \leq r-1\} \quad (45)$$

Since $i \geq 2$, these polynomials do not involve the first coordinate (i.e. the coordinate which corresponds to $[\lceil r/c \rceil]$). Let $CC_2$ be the corresponding family of subsets, i.e.

$$CC_2 = \{S_f | f \in CF_2\} \quad (46)$$

where $S_f = \{x \in D | f(x) \neq 0\}$. Here, $f(x) = g(x_{i-1}) - g(x_i)$ for some $g \in F_q[X]$. The number of sets $S_f$ of this type is $(t-1)q^r$. We denote $$CC_1 = \{S_R | |R| \leq r\} \cup CC_2 \quad (47)$$

To show that $|CC_1|=O(tq^r)$, we bound the number of sets $\{S_R\}$. Up to a constant factor, this number is, $$\lceil \tfrac{r}{c} \rceil^r \binom{q}{r} \leq \lceil \tfrac{r}{c} \rceil^r \left(\tfrac{qc}{r}\right)^r \leq \left(\left(\tfrac{r}{c}+1\right)\tfrac{qc}{r}\right)^r \leq \left(1+\tfrac{c}{r}\right)^r q^r \leq e^c q^r = O(q^r),$$

where we used that since $$\binom{n}{r} = (nc/r)^r$$

and $q \leq n$, then $$\binom{q}{r} \leq (qc/r)^r.$$

For constant $$\alpha > \frac{1}{1-\beta} + \frac{1}{t}$$

and $\beta > 0.525$ and assuming $\max(r^{60}, r^{2+1/t}t^2) = O(n^{1/t})$, and for sufficiently large n, we describe an explicit $$\left(n, O\left((rt)^2 \binom{n}{r}^{1/t}\right), r, t\right)$$

exclusive set system. Further, broadcasting in this system can be done in poly(r, t, log n) time.

For each $x=(x_0, x_1, \ldots, x_t) \in D$, we define $x'=(x_1, \ldots, x_t) \in F_q^t$, i.e. $x'$ is the projection of x on $F_q^t$. Let R' denote the projection of R on $F_q^t$, i.e. $R'=\{x \in D|x' \in R\}$. Clearly, $|R'| \leq |R|$. If the revoked set R is such that no two members share their ith coordinate for any $i>1$, the corresponding cover of t sets consists of the set $S_R$ and the sets $S_{f_i}=\{x \in D|f_i(x) \neq 0\}$, $i=2, \ldots, t$, wherein each $f_i$ does not depend on $X_0$ and in fact belongs to $F_q[X_1, \ldots, X_t]$. Thus, we can write $f_i(x)$ as $f_i(x')$, and $$S_{f_i} = \lceil \lceil r/c \rceil \rceil \times \{x'|f_i(x') \neq 0\} \tag{48}$$

Each $f_i$ is constructed as in (11). More particularly, the server constructs a polynomial $g_i \in F_q[X]$ of a degree at most $r-1$ such that $$g_i(u_{i-1})=u_i \text{ for each } u=(u_0, \ldots, x_t) \in R$$

This is possible because for each $i \geq 2$, all $u_{i-1}$ are distinct in R. See (10). Then the server sets:

$$f_i = g_i(X_{-1}) - X_i$$

Clearly, $f_i \in CF_2$ as defined by (45).

The union $C_R$ of the set $S_R$ of (44) and the sets $S_{f_i}$ ($i=2, \ldots, t$) equals the compliment of R. Indeed, if $x \in R$, then x does not belong to $S_R$, and $f_i(x)=0$ for all i. Hence, $x \notin C_R$. Vice versa, if $x \notin C_R$, then its first two coordinates must agree with those of some $u \in R$. It follows from distinctness and our construction that $x=u$.

For sets R which may or may not share their ith coordinate for some $i>1$, we proceed as in Lemma 2, ignoring the first coordinate. More particularly, at step 750, the server defines $m=r^2t$ disjoint blocks $B_1, \ldots, B_m$, wherein each of these blocks B consists of some elements $b_1, \ldots, b_r$ in $F_q$ (see FIG. 12). This is possible if $r^2t^2 \leq q$. For each of these blocks B, the server defines a linear transformation $L_B: F_q^t \to F_q^t$ as in (23). The server then defines $CF_B$ as in (15), and/or $CF_{B1}$ as in (28), except that the server uses $F_q$ instead of F (and $F_q[X]$ instead of F[X]). For each $x' \in F_q^t$, we let $L_B x'_i$ denote the ith coordinate of $L_B x'$, where $i=1, \ldots, t$. The exclusive set system is as follows:

$$CC=\{S_{R,B}||R|\leq r, B \in \{B_1, \ldots, B_m\}\} \cup \{S_f|f \in CF_B \text{ for some } B \in \{B_1, \ldots, B_m\}\} \tag{49}$$

where $$S_{R,B}=\{x=(x_0, x_1, \ldots, x_t) \in D|(x_0, L_B x_1) \neq (u_0, L_B u_1) \text{ for all } (u_0, u_1, \ldots, u_t) \in R\} \tag{50}$$

Alternatively, we can write:

$$CC=\{S_{R,B}| \text{ for all } |R| \leq r \text{ and all } B\} \cup \{S_f|f \in CF_{B1} \text{ for some } B\} \tag{51}$$

where $CF_{B1}$ is defined as in (28) except that F[X] is replaced with $F_q[X]$.

Step 810 (FIG. 11) is performed as follows. For a given $R \subset D$, the server finds a block B for which $L_B$ is good for R'. The server constructs a cover $C_R$ for D\R as follows. One element of the cover is the set $S_{R,B}$ (50). The remaining elements are the sets $\{S_f|f \in \{f_2, \ldots, f_t\}\}$ where the polynomials $f_i$ ($i \geq 2$) are constructed as follows. For each fixed $i=2, \ldots, t$ the server finds a polynomial $g_{i,R}=g_i \in F_q[X]$ by interpolating from $$g_i(L_B u_{i-1})=L_B u_i \text{ for each } u' \in R'$$

This is possible because all $L_B u_i$ are distinct. See (19). The server sets:

$$f_i = g_i(L_B X_{i-1}) - L_B X_i \tag{52}$$

Hence, $C_R = \{S_{R,B}, S_{f2}, \ldots, S_{ft}\}$, where $$S_{f_i} = S_{f_i}(R) = \{x \in [n] | g_i(L_B x_{i-1}) \neq L_B x_i\} \tag{53}$$

This technique works both for the sets R that share their ith coordinate for some $i>1$ and for the sets R that do not.

It will be apparent to one skilled in the art that if $\max(r^{60}, r^{2+1/t}t^2)=O(n^{1/t})$, then it follows that $$\max(r^{1+\varepsilon}, t) \leq n^{1/t} \tag{54}$$

$$r \leq \binom{n}{r}^{(1-\beta)/t} \tag{55}$$

$$r^2 t^2 \leq q \tag{56}$$

The above argument constitutes a proof of the following theorem, which summarizes the parameters of our construction:

Theorem 9 Let $$\alpha > \frac{1}{1-\beta} + \frac{1}{t}$$

and $\beta > 0.525$ be any constants, and assume $\max(r^{60}, r^{2+1/t}t^2)=O(n^{1/t})$. Then for sufficiently large n, there is an explicit $$\left(n, O\left((rt)^2 \binom{n}{r}^{1/t}\right), r, t\right)$$

exclusive set system. Further, broadcasting can be done in poly(r, t, log n) time.

To apply the technique to the graph-based construction of Theorem 6, we replace (56) with $$r^2 t = O(q) \qquad (57)$$

At step 750 (FIG. 10), the server constructs a graph 1310 (FIG. 13) and associates its vertices b with the points of $U' = \{x' | x \in [n]\}$ (the projection of [n] on $F_q^t$). The server defines the exclusive set system CC as follows:

$$CC = \{S_R | |R| \leq r\} \cup CC_f \qquad (58)$$

where $CC_f$ is a set of polynomials in $F_q[X_1, \ldots, x_t]$ of degree at most r. $CC_f$ is defined similarly to (30):

$$CF_f = \left\{ \prod_{j=1}^{r'} \left( \sum_{i=0}^{t-1} b^i X_{i+1} - i_j \right) \middle| 0 \leq r' \leq r, \text{ distinct } i_1, \ldots, i_{r'} \in F_q, b \in V \right\} \cup$$

$$\left\{ g\left(\sum_{i=0}^{t-1} b^i X_{i+1}\right) - \sum_{i=0}^{t-1} c^i X_{i+1} \middle| g \in F_q[X], \deg(g) \leq r-1, (b, c) \in E \right\} \qquad (59)$$

$CC_f$ consists of the corresponding sets $\{x \in D | f(x) \neq 0\}$ for $f \in CF_f$, and thus of all the sets S of the form:

$$S = \left\{ x \in [n] \middle| \sum_{i=0}^{t-1} b^i x_{i+1} \notin \{i_1, \ldots, i_{r'}\} \right\}, \qquad$$

where $0 \leq r' \leq r$, distinct $i_1, \ldots, i_{r'} \in F_q$, $b \in V$, or $$S = \left\{ x \in [n] \middle| g\left(\sum_{i=0}^{t-1} b^i x_{i+1}\right) \neq \sum_{i=0}^{t-1} c^i x_{i+1} \right\},$$

where $g \in F_q[X]$, $\deg(g) \leq r-1$, $(b,c) \in E$.

Figure 18:
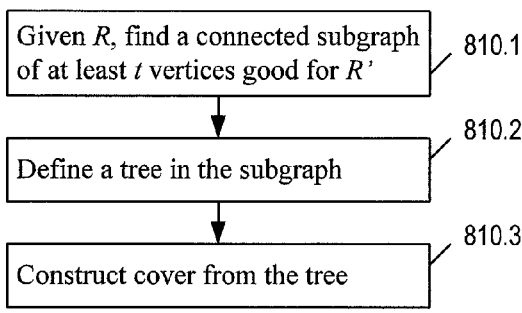

At step 810 (FIG. 11), given a revoked set R, the server constructs a cover $C_R$ for $[n] \setminus R$ as shown in FIG. 18. Steps 810.1-810.3 of FIG. 18 are similar to the respective steps of FIG. 14 but are performed on R' and $F_q^t$ instead of R and $F^t$. At step 810.1 (FIG. 18), the server finds a connected subgraph 1510 (FIG. 15) of at least t vertices that are good for R'. This can be done using techniques described above in connection with FIG. 14. Of note, $|R'| \leq |R|$. At step 810.2 (FIG. 18), the server defines a tree 1610 (FIG. 16) which is a subgraph of the subgraph 1510. This again can be done as in FIG. 14.

At step 810.3 (FIG. 18), the server then constructs a cover $C_R$ as follows. Let v be the root of the tree 1610 constructed at step 810.2. One element of $C_R$ is:

$$S_{R,v} = \{x = (x_0, x_1, \ldots, x_t) \in D | (x_0, p_{x'}(v)) \neq (u_0, p_{u'}(v)) \text{ for all } u \in R\} \qquad (61)$$

For each non-root node b in the tree, the server finds a polynomial $g_b$ of degree at most $|R'|-1$ by interpolating from $$g_b\left(\sum_{i=0}^{t-1} p(b)^i u_{i+1}\right) = \sum_{i=0}^{t-1} b^i u_{i+1} \text{ for all } u' = (u_1, \ldots, u_t) \in R', \qquad (62)$$

i.e., $$g_b(p_{u'}(b)) = p_{u'}(b) \text{ for all } u' \in R', \qquad (63)$$

and set $$f_b = g_b\left(\sum_{i=0}^{t-1} p(b)^i X_{i+1}\right) - \sum_{i=0}^{t-1} b^i X_{i+1} \qquad (64)$$

Then $C_R = \{S_{R,v}, S_{fb}\}$ is indeed a cover for $[n] | R$, as can be shown in a way similar to that given for Theorem 6.

If we use an $$\left(m = \gamma r^2 t, 6, \frac{1}{2} - \frac{\sqrt{5}}{6}\right)$$

expander graph is in Theorem 6, with γ as in (38), we arrive at the following theorem.

Theorem 10 Let $$\alpha > \frac{1}{1-\beta} + \frac{1}{t}$$

and β>0.525 be any constants, and assume $\max(r^{60}, r^{2+1/t}t) = O(n^{1/t})$. For sufficiently large n, there is an explicit $$\left(n, O\left(r^2 t \binom{n}{r}^{1/t}\right), r, t\right)$$

-exclusive set system. Further, broadcasting can be done in poly(r, t, log n) time.

To adapt Theorem 8, we just need to change the third assumption (56) to $r^2 t = O(q^{1-\epsilon})$ for some $\epsilon > 0$. Indeed, as in the proof of Lemma 7, one skilled in the art can infer that the probability v that some $s \in S$ is not good for R can be bounded above by $q^{-\epsilon}$. By our assumption that $r^{1+\epsilon} \leq n^{1/t}$, we have $n/r = n^{\Omega(1)}$ so that $q^{-\epsilon} = n^{-\Omega(1/t)}$, and the proof of Lemma 7 goes through (with larger constants).

These arguments constitute a proof of the following theorem, which summarizes the parameters of the method described herein.

Theorem 11 Let $$\alpha > \frac{1}{1-\beta} + \frac{1}{t},$$

$\beta > 0.525$, and $\epsilon > 0$ be any constants, and assume that we have $\max(r^\alpha, r^{2+(1-\epsilon)/t}) < n^{(1-\epsilon)/t}$. Then there is an efficient algorithm that with probability $1-n^{-\Theta(r)}$, generates an $$\left(n, O\left(r^2 t \binom{n}{r}^{1/t}\right), r, t\right)$$

-exclusive set system. Broadcasting takes time poly(r, t, log n).

6 Method for Constructing Exclusive Set Systems from Smaller Exclusive Set Systems The above methods were shown to provide low k values for restricted choices of n,r,t. We now show how to extend these methods to provide similar k values for arbitrary n,r,t. We construct many small exclusive set systems on different subsets of [n] and take their union to obtain the final explicit exclusive set system. Each of the small systems will be constructed with parameters $n_B, r_B, t_B$ (where B is some index) satisfying the requirements of the schemes in the previous Sections.

Figure 19:
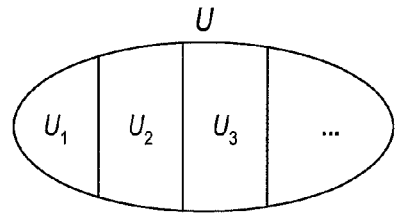
FIGS. 19 and 20 illustrate data structures according to some embodiments of the present invention.

FIG. 19 illustrates this technique. Let U be the set of all users (e.g. U=[n]). U is subdivided into disjoint subsets $U_B$, say $U_1, U_2, \ldots$. Denote $n_B = |U_B|$. Suppose that an $(n_B, k_B, r_B, t_B)$-exclusive set system $CC(U_B)$ is defined over $U_B$ for each B. Let $R \subset U$. Denote $R_B = R \cap U_B$, and suppose $|R_B| \leq r_B$ for all B. Then each $U_B \setminus R_B$ can be covered with at most $t_B$ elements $\{S_{B,1}, S_{B,2}, \ldots\}$ of $CC(U_B)$, and hence $U \setminus R$ can be covered with the union of these elements over all B:

$$U \setminus R = \bigcup_{B,j} S_{B,j}$$

The union contains at most $\Sigma t_B$ sets $S_{Bj}$.

Figure 20:
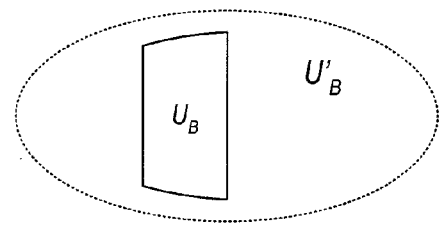

Of note, an $(n_B, k_B, r_B, t_B)$-exclusive set system for $U_B$ can be build from an $(n, k_B, r_B, t_B)$-exclusive set system for a larger set $U'_B \supset U_B$ (FIG. 20), with $|U'_B| = n$. Indeed, if sets $\{S\}$ form an $(n, k_B, r_B, t_B)$-exclusive set system for $U'_B$, then the sets $\{S \cap U_B\}$ form an $(n_B, k_B', r_B, t_B)$-exclusive set system for $U_B$ with $k_B' \leq k_B$. The set $U'_B$ can be constructed by augmenting $U_B$ with any additional points.

Figure 21:
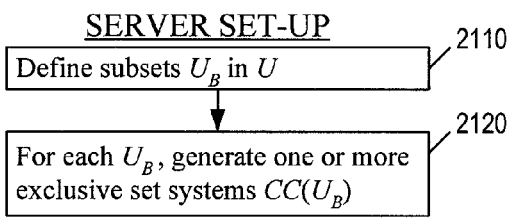
FIG. 21 is a flowchart of an exclusive set system generation method according to some embodiments of the present invention.

In FIG. 19, the sets $U_B$ were chosen so that $|R \cap U_B| \leq r_B$. We may need many subset collections $\{U_B\}$ to enable such choice for all the sets R with $|R| \leq r$. We denote the total collection of such subsets as $\{U_B\}$. In some embodiments, at the set-up stage (FIG. 21), the server defines a family of subsets $U_B \subset U$ (step 2110), and defines one or more exclusive set systems $CC(U_B)$ for each $U_B$ (step 2120). In some embodiments, at step 2120, the server performs step 750 of FIG. 7 or 10 for each $U_B$. In some embodiments, each system $CC(U_B)$ meets the requirements of some of the previous constructions, e.g. of Theorem 3, 6, 9, 10 or 11.

The exclusive set system CC(U) output by the server is the union of systems $CC(U_B)$. The server performs steps 760, 770 (FIG. 7 or 10) for each $S \in CC(U)$.

Figure 22:
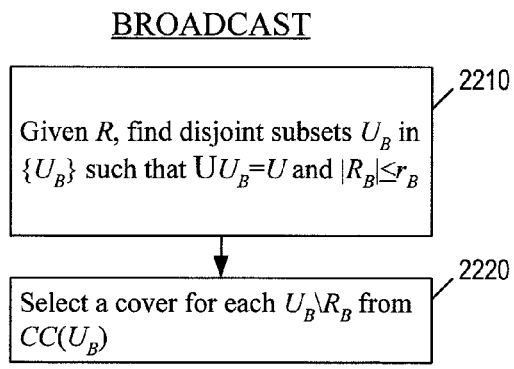
FIG. 22 is a flowchart for constructing a set cover according to some embodiments of the present invention.

To perform a broadcast (FIG. 22), given a revoked set R, the server finds a family of disjoint subsets $U_B$ (step 2210), and applies the technique of FIG. 19. In particular, the subsets $U_B$ are chosen so that their union is U, and further the corresponding exclusive set systems $CC(U_B)$ constructed at step 2120 are $(n_B, k_B, r_B, t_B)$-exclusive set systems such that $|R_B| \leq r_B$ where $R_B = R \cap U_B$. The server then selects a cover for each $U_B \setminus R_B$ from the respective system $CC(U_B)$. See step 2220. This step may include the steps 810, 820 (FIG. 8 or 11) for each B. The union of these covers provides a cover for $U \setminus R$. Then the server performs a broadcast as in FIG. 4A.

In some embodiments, the size of our system CC(U) will be $k = \text{poly}(r, t, \log n) n^{r/t}$, matching the lower bound up to the poly(r, t, log n) factor and the optimizations described in conjunction with key complexity balancing (Theorems 9-11). Here poly(r, t, log n) denotes a polynomial in r, t and log n.

We now describe one embodiment of this construction. In this embodiment, for each index B, the server constructs up to four exclusive set systems $CC(U_B)$ at step 2120 as described below. A separate familty of the $U_B$ sets is performed for each revoked set size r' such that $0 \leq r' \leq r$. At the broadcast stage, given a set R with $|R| = r'$, the server will use the exclusive set systems constructed for the revoked set size r'. The key complexity is largest for the revoked set size of r, so the union will be at most r+1 times larger.

We now describe how to construct the family for a fixed r'. We may assume $r' \geq 1$, because the construction is trivial for r'=0 (just take the entire set U as the element of the exclusive set system).

In some embodiments, the sets $U_B$ are chosen as follows. First, the server defines (d+1)-dimensional coordinate systems on U where $$d = \log n / \log r'^2 \tag{65}$$

Figure 23:
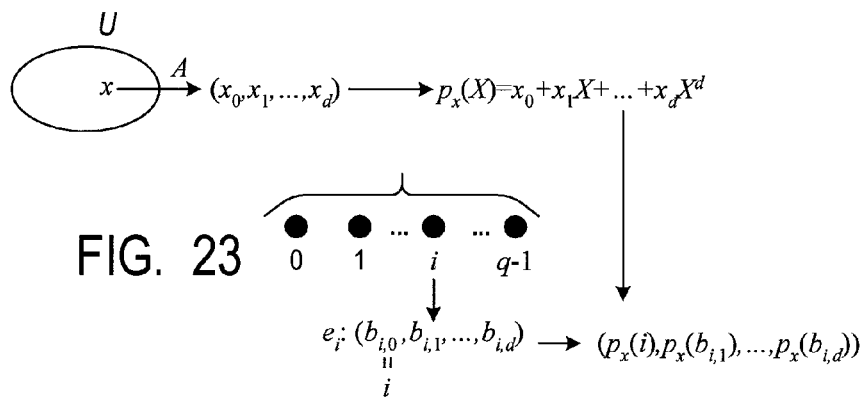
FIG. 23 illustrates data structures according to some embodiments of the present invention.

More particularly, let $$q \geq r'^2 d \tag{66}$$

be prime (possibly, but not necessarily, the smallest prime satisfying (66)). Then $$q^{d+1} \geq n, \tag{67}$$

so the points in U can be identified with points in $F_q^{d+1}$ using some injective mapping A:

$$A(x) = (x_0, \ldots, x_d) \in F_q^{d+1} \tag{68}$$

as shown in FIG. 23. We will sometimes write $x = (x_0, \ldots, x_d)$. Further, each point $x = (x_0, \ldots, x_d)$ can be identified with a degree-d polynomial $p_x(X) \in F_q[X]$ as in (24):

$$p_x(X) = x_0 + x_1 X + \ldots + x_d X^d \tag{69}$$

Since q>d (see (66)), each polynomial $p_x$ (and hence each point x) is completely defined by its values on any given (d+1) points of $F_q$. These values serve as coordinates for our coordinate systems. We define a coordinate system $e_i$ for each element $i \in F_q$ by choosing a sequence of (d+1) points $\{b_{i,0}, b_{i,1}, \ldots, b_{i,d}\}$ of $F_q$. This sequence of points will define the system $e_i$ in a way similar to the blocks B in FIGS. 12 and (23)-(25). Any sequence of points can be chosen. In some embodiments, different sets of points are chosen for different i. In the embodiment being described, $b_{i,0} = i$ for all i.

In each coordinate system $e_i$, each $x \in U$ is represented as $$x = (p_x(b_{i,0}), p_x(b_{i,1}), \ldots, p_x(b_{i,d})) \in F_q^{d+1} \tag{70}$$

In our case, $b_{i,0} = i$, so $$x = (p_x(i), p_x(b_{i,1}), \ldots, p_x(b_{i,d})) \tag{71}$$

See FIG. 23. To avoid ambiguity when specifying coordinates in this coordinate system, we will sometimes use the subscript i at the end as follows:

$$x=(x_0, x_1, \ldots, x_d)_i$$

This expression means therefore that $x_j = p_x(b_{i,j})$, $j=0, \ldots, d$ (to distinguish from (68)).

We will say that an element $i \in F_q$ is "good for R" if $$p_u(i) \neq p_v(i) \text{ for any } u, v \in R \quad (72)$$

Otherwise, i will be called "bad for R".

At step 2210 (FIG. 22), the server will choose a coordinate system $e_i$ such that i is good for R. Such a coordinate system exists because for any r' degree-d polynomials in $F_q[X]$ there is a point in $F_q$ on which the polynomials all differ. Indeed, any two degree-d polynomials agree on at most d points, so for a set of r' polynomials, the number of points on which at least two of the polynomials agree has cardinality at most $$\binom{r'}{2} d,$$

which is less than q (see (66)).

At step 2210 the server finds i good for R and also finds disjoint subsets $U_1, U_2, \ldots \in \{U_B\}$, see FIG. 19, such that $|R \cap U_B| \leq r_B$ for all $U_B$. Since all the elements $u = (u_0, \ldots, u_d)_i$ of R have different first coordinates $u_0 = p_u(i) \in F_q$ (see (72)), the sets $U_B$ are constructed based on the first coordinates. More particularly, loosely speaking, the server subdivides $F_q$ into non-empty disjoint intervals $[a_j, b_j]$ (j=1, 2, ...) each of which contains at most some number $r_B$ of first coordinates of R:

$$|\{u_0 | u=(u_0, \ldots, u_d)_i \in R\} \cap [a_j, b_j]| \leq r_B \quad (73)$$

For each B, $U_B$ is defined as follows:

$$U_B = [a_j, b_j] \times F_q^d \quad (74)$$

Actually, we can define $U_B$ as the subset of $[a_j, b_j] \times F_q^d$ which is the set of all points in U whose first coordinate is in $[a_j, b_j]$ in the $e_i$ coordinate system.

To enable such a construction, the sets $U_B$ are defined as follows at step 2110. One set $U_B$ is defined for each coordinate system $e_i$ and each non-empty interval $[a,b] \in [0, q-1]$:

$$U_B = U_{i,[a,b]} = [a,b] \times F_q^d \quad (75)$$

or rather $U_B$ is the set of all the points in U whose first coordinate is in [a,b] in the $e_i$ coordinate system. Clearly, the number of non-empty intervals [a,b] is less than $q^2$, so the total number of sets $U_B$ (for all the systems $e_i$, $i=0, \ldots, q-1$) is less than $q^3$.

For each $U_B$, the server defines up to four exclusive set systems at step 2120, as described below.

Clearly, if $U_B = U_{i,[a,b]}$, then $n_B = b - a + 1$. However, we will use the technique of FIG. 20 to set $n_B = n$. The exclusive set systems will be $(n, k_B, r_B, t_B)$-exclusive, with up to four different combinations of parameters $k_B, r_B, t_B$. More particularly, we will define parameters $\rho$ and $\tau$ such that $r_B = \rho$ or $\rho - 1$, and $t_B = \tau$ or $\tau + 1$.

In constructing the systems $CC(U_B)$, let us apply, for example, the scheme of Theorem 3, 6, 9, 10 or 11. In particular, we choose some $\beta > 0.525$ such that $(1-\beta)^{-1} \in (2,3)$. Then $\alpha < 4$, and $r_B^\alpha < r_B^4$. Turning to Theorem 9 for example, we see that $r_B^{2+1/t_B} \leq r_B^3$. Thus, the Theorem 9 condition is satisfied if:

$$\max(r_B^4, r_B^3 t_B^2) = O(n^{1/t}). \quad (76)$$

This condition is satisfied in turn if $$r_B^4 t_B^2 < n^{1/t_B} \quad (77)$$

This last condition is satisfied if $$r_B^4 t_B < n^{1/2 t_B} \quad (78)$$

The inequality (78) is also sufficient to accommodate Theorems 3, 6, 10 and 11. We will therefore define the exclusive set systems $CC(U_B)$ such that $$r_B^4 t_B < n^{1/2 t_B} \quad (79)$$

The $CC(U_B)$ key complexity is $O((r_B t_B)^2 n^{r_B/t_B})$ for Theorem 3, $O(r_B^2 t_B \, n^{r_B/t_B})$ for Theorem 6, $$O\left((r_B t_B)^2 \binom{n}{r_B}^{1/t_B}\right)$$

for Theorem 9, $$O\left(r_B^2 t_B \binom{n}{r_B}^{1/t_B}\right)$$

for Theorem 10, and $$O\left(r_B t_B \binom{n}{r_B}^{1/t_B}\right)$$

for Theorem 11. Since $$\binom{n}{r_B}^{1/t_B} \leq n^{r_B/t_B},$$

the key complexity for these cases does not exceed $$\text{poly}(r_B, t_B) n^{r_B/t_B}$$

where $\text{poly}(r_B, t_B)$ is a suitable polynomial in $r_B, t_B$ (the polynomial is equal to $(r_B t_B)^2$ for Theorems 3 and 9, $r_B^2 t_B$ for Theorems 6 and 10, and $r_B t_B$ for Theorem 11). We will therefore choose $r_B$ and $t_B$ so that $$r_B / t_B \approx r'/t$$

In fact, we will choose $\rho$ and $\tau$ so that $$\rho/\tau \approx r'/t \quad (80)$$

Loosely speaking, if each $R_B$ has about $r_B \approx \rho$ points at step 2210, then the number of sets $U_B$ is roughly $r'/\rho$. If each cover $CC(U_B)$ constructed at step 2220 has about $t_B \approx \tau$ sets, the total complement cover $C_R$ will have about $(r'/\rho)\tau$ sets. By virtue of (80), this number is about t, which is what we need for a complement cover.

Given the parameters n,r',t, if $r'^4 t < n^{1/2\tau}$ (as in (78)), the server may use the scheme of Theorem 3, 6, 9, 10 or 11 directly to define a single (n,k,r',t)-exclusive set system for U, without subdividing U into subsets $U_B$. Otherwise, if possible, we will choose $\rho$ and $\tau$ to satisfy subject to the constraint $$\Omega\left(n^{\frac{1}{4\tau}}\right) \leq \rho^4 \tau < n^{\frac{1}{2\tau}}, \quad (81)$$

$$\frac{\rho-1}{\tau} < \frac{r'}{t} \leq \frac{\rho}{\tau}. \quad (82)$$

The following algorithmic procedure illustrates how to find $\rho$ and $\tau$.

Procedure Generate(r',t):
1. Set integer variables $\rho = r'$ and $\tau = t$.
2. i=2.
3. While $\tau > 1$,
   (a) If $\rho^4 \tau < n^{1/2\tau}$, then exit.
   (b) Else,
      i. $\tau = \lfloor t/i \rfloor$.
      ii. Choose $\rho$ so that $$\frac{\rho-1}{\tau} < \frac{r'}{t} \leq \frac{\rho}{\tau}.$$

iii. i=i+1.
End of Generate

It will be apparent to one skilled in the art after reviewing the foregoing argument that the above procedure leads to finding such $\rho$ and $\tau$. It should be borne in mind, however, that the invention may be practiced without knowledge of the details of this proof. These details are included to demonstrate the correctness and feasibility of the steps outlined toward achieving the objectives of the present invention.

Lemma 12. If Generate outputs $(\rho,\tau) \neq (r',t)$ and $\tau \neq 1$, then $\rho,\tau$ satisfy constraints (81) and (82).

Proof: Suppose $\tau \neq 1$. Then in some iteration we have $\rho^4 \tau < n^{1/(2\tau)}$. If this occurs in the first iteration, then we have $(\rho,\tau) = (r',t)$. Otherwise, consider the last time for which $\rho^4 \tau \geq n^{1/(2\tau)}$. Suppose $\tau = \lfloor t/i \rfloor$, and let $\tau' = \lfloor t/(i+1) \rfloor$ be the value of $\tau$ in the next iteration. Note that $\tau, \tau' > 1$. Then $\tau'/\tau = \lfloor t/(i+1) \rfloor / \lfloor t/i \rfloor$. Suppose $\lfloor t/(i+1) \rfloor = c$. Then $t \leq (c+1)(i+1)-1$, so that $$\lfloor t/i \rfloor \leq \left\lfloor \left(\frac{i+1}{i}\right)(c+1) - \frac{1}{i} \right\rfloor = \lfloor c+1+c/i \rfloor.$$

Thus, $$\tau'/\tau \geq c/(c+1+c/i) \geq 1/(1+1/c+1/i) \geq 1/2,$$

since c,i>1 are integers. We also claim that $\rho' \geq \rho/4$, where $\rho'$ is the value of $\rho$ in the next iteration. Indeed, if $\rho \leq 4$, this follows from the fact that $\rho'$ is a positive integer. On the other hand, if for $\rho > 4$ we had $\rho' < \rho/4$, then $$\frac{\rho'}{\tau'} < \frac{\rho/4}{\tau/2} = \frac{\rho/2}{\tau} < \frac{\rho-1}{\tau} \leq \frac{r'}{t},$$

contradicting constraint (82), which holds because of step 3(b)ii. Thus, $$(\rho')^4 \tau' \geq \frac{\rho^4 \tau}{2 \cdot 4^4} \geq \frac{n^{\frac{1}{2\tau}}}{2 \cdot 4^4} = \Omega\left(n^{\frac{1}{4\tau'}}\right),$$

which shows that constraint (81) holds.

We can now, for instance, apply the explicit construction of Theorem 3, 6, 9, 10 or 11 to individual sets $U_B = U_{i,[a,b]}$.

At the set-up stage (FIG. 24), at step 2410, the server determines if $r^4 t < n^{1/(2t)}$. If so, the server constructs CC(U) as in Theorem 3, 6, 9, 10, or 11 (step 2420). If not, step 2421 is performed for each r' value from r down to 0. At step 2422, the server determines if $r'^4 t < n^{1/(2t)}$. If so, the server constructs an $(n,k_B,r',t)$-exclusive set system CC(U) as in Theorem 3, 6, 9, 10, or 11 (step 2424). The same complement cover will work for smaller r' values, so in some embodiments the set-up stage terminates at this step. If the inequality of step 2422 does not hold, then at step 2430 (FIG. 24), the server determines d, q as in (65), (66), and runs Generate (r',t) to obtain $\rho$ and $\tau$. The server also selects some mapping A as in (68), as shown at 2440. At step 2450, the server defines the coordinate systems $e_i$ by choosing the blocks $(b_{i,0}, b_{i,1}, \ldots, b_{i,d})$ for each i (see FIG. 23), possibly with $b_{i,0} = i$. At step 2460, the server generates an $(n,k_B,\rho-1,\tau)$-exclusive set system, an $(n,k_B,\rho,\tau)$-exclusive set system, an $(n,k_B,\rho-1,\tau+1)$-exclusive set system, and an $(n,k_B,\rho-1,\tau+1)$-exclusive set system (which can be collectively denoted as $CC(U_{i,[a,b]})$) for each $U_{i,[a,b]}$. Each of these exclusive set systems is generated as in Theorem 3, 6, 9, 10 or 11, with suitable (possibly different) $k_B$ parameters as defined in these Theorems.

Figure 24:
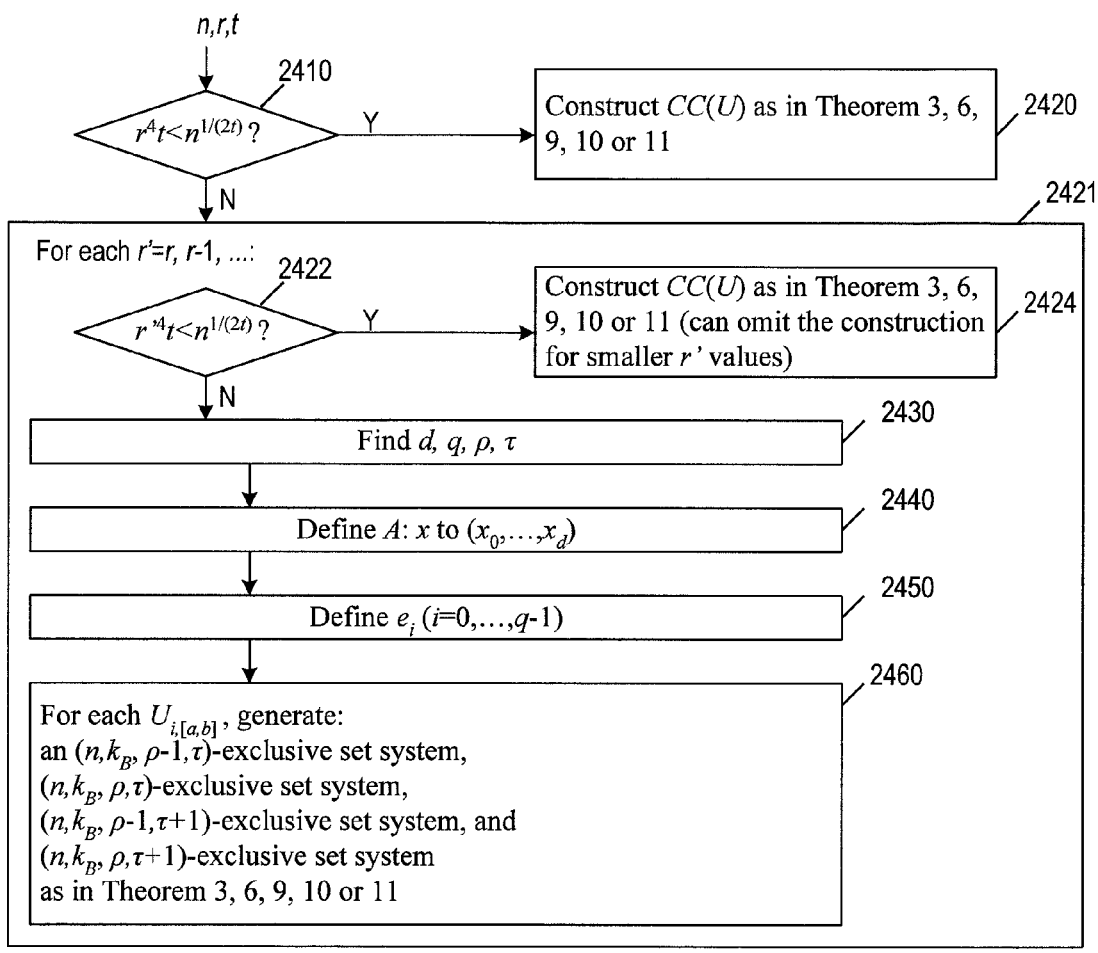
FIG. 24 is a flowchart of an exclusive set system generation method according to some embodiments of the present invention.
Figure 25:
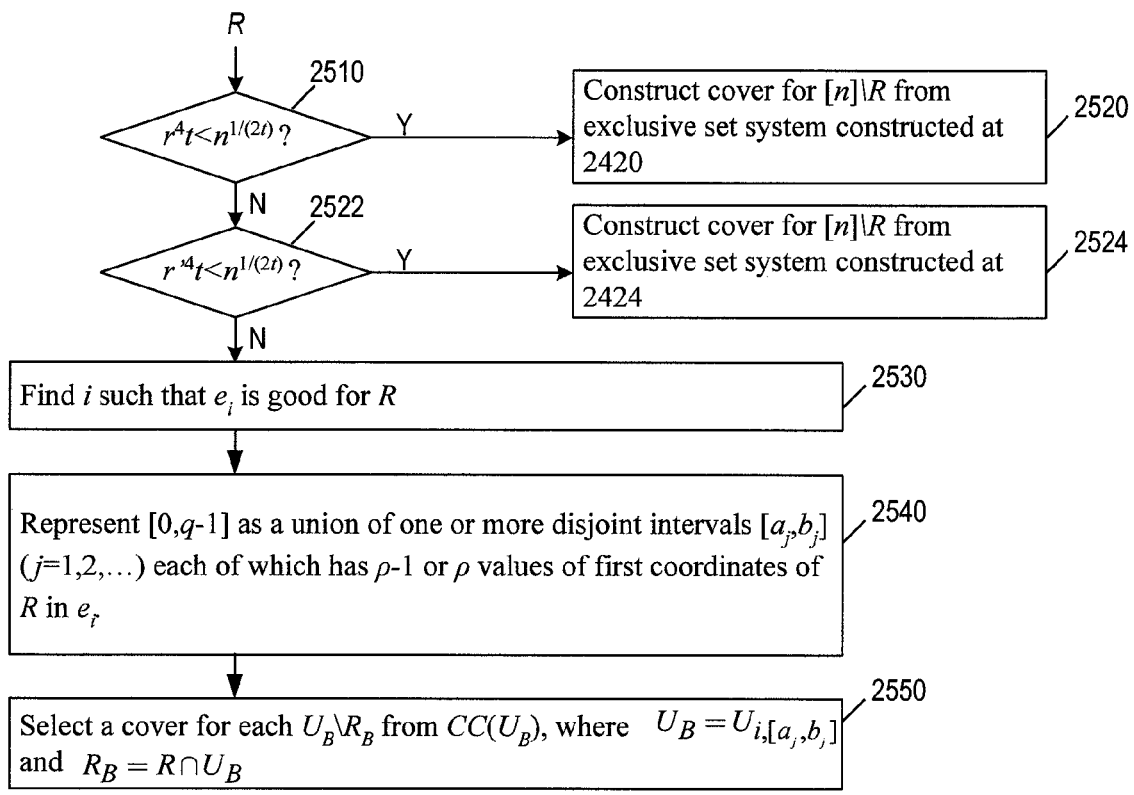
FIG. 25 is a flowchart for constructing a set cover according to some embodiments of the present invention.

To broadcast with a revoked set R (FIG. 25) of a size r', if $r^4 < n^{1/(2t)}$ (step 2510), then the server constructs a complement cover from the corresponding exclusive set system constructed at step 2420 (FIG. 24). If the inequality of step 2510 does not hold, but $r'^4 < n^{(1/2t)}$ (step 2522), the server constructs a complement cover from the corresponding exclusive set system constructed at step 2424. If the inequality of step 2522 does not hold, the server uses the d, q, A parameters determined at steps 2430, 2440 (or re-computes these parameters). For these parameters, the server finds a coordinate system $e_i$ good for R, i.e. a system in which the elements of R all differ on their first coordinate (if r'=1, any system $e_i$ will do). See step 2530. At step 2540, the server partitions the interval [0,q−1] into one or more disjoint intervals $[a_j, b_j]$ (j=1, 2, ...) such that each interval $[a_j, b_j]$ contains $r_j$ values of the first coordinates of R, where $r_j$ is either $\rho-1$ or $\rho$. At step 2550, for each j (i.e. for each interval $[a_j, b_j]$), the server determines the corresponding $t_j$ value for the complement cover size, such that $t_j$ is either $\tau$ or $\tau+1$ and $\Sigma t_j = t$. Then the server selects a cover for each set $U_B \setminus R_B$, where $U_B$ corresponds to $[a_j, b_j] \times F_q^d$ and $R_B = R \cap U_B$. Each cover is selected from the corresponding $(n,k_B,r_j,t_j)$-exclusive set system constructed at step 2460 (FIG. 24). The union of these covers forms a cover for U\R in CC(U), as explained above in connection with FIG. 19.

In the foregoing, the key complexity is derived. It should be borne in mind, however, that the following argument is provided to demonstrate that the methods presented herein achieve the desired performance claims and that the invention may be practiced without reference to this argument. It should be apparent to one skilled in the art after reviewing the following argument that the set system described herein uses poly(r, t, log n)$n^{r'/t}$ keys. In particular, for each value of r', there are q coordinate systems $e_i$. For each system $e_i$, there are no more than $q^2$ intervals $[a,b]$. Each interval corresponds to an exclusive set system generated by Theorem 3, 6, 9, 10 or 11 on n points with the number $r_B$ of revoked users being either $\rho$ or $\rho-1$ and the cover size $t_B$ either $\tau$ or $\tau+1$. To analyze the number of keys per interval, we divide the output of Generate into two cases (recall that at this point we need only consider $(\rho,\tau) \neq (r,t)$).

Case 1: $\tau \neq 1$. In this case the number of keys per interval is at most $$\text{poly}(r_B, t_B) n^{r_B/t_B} \leq \text{poly}(r,t) n^{\rho/\tau}$$

$$\leq \text{poly}(r,t) n^{r/t} n^{1/\tau}$$

$$\leq \text{poly}(r,t) n^{r/t},$$

where the second inequality follows by constraint (82) and the third by constraint (81).

Case 2: $\tau=1$. Then by the analysis in Lemma 12, we have $\rho^4 = \Omega(n^{1/4})$. We have exactly the same sequence of inequalities as in case 1, where the second inequality follows again by constraint (82), but now the third inequality follows from the fact that $r \geq r_B = n^{\Omega(1)}$, so that $\text{poly}(r) = n^{1/\tau}$.

Thus, the total number of keys is $q \cdot q^2 \cdot \text{poly}(r, t, \log n) n^{r/t} = \text{poly}(r, t, \log n) n^{r/t}$.

The above argument constitutes a proof to the following theorem which summarizes the performance parameters achieved by our construction.

Theorem 13. Let n,r,t be positive integers and suppose n is sufficiently large. There is an explicit $(n, \text{poly}(r, t, \log n) n^{r/t}, r,t)$-exclusive set system. Broadcasting can be done in $\text{poly}(r, t, \log n)$ time.

Remark 14. It should be apparent to one skilled in the art that a number of optimizations are possible. For example, we can use randomness in the generation of the coordinate systems so that the n points are evenly-distributed along the interval $[0,q-1]$. We can also use random permutations of $[0,q-1]$ so that for a given broadcast, each interval has about n/r users, resulting in complexity $$\text{poly}(r, t, \log n) \binom{n}{r}^{1/t},$$

together with a smaller $\text{poly}(r, t, \log n)$ factor.

The invention is not limited to the embodiments described above. For example, instead of covering $[n] \backslash R$ with sets $S_f$ on which some functions $f$ are not zero, one can cover $[n] \backslash R$ with sets on which some functions $f$ are not equal to some other predefined value, e.g. 1. For Theorems 9-11, the sets $S_R$ may involve more than two coordinates. For example, (61) can be replaced with:

$$S_{R,v} = \{x = (x_0, x_1, \ldots, x_t) \in D | (x_0, x_1, p_{x''}(v)) \neq (u_0, p_{u''}(v)) \text{ for all } u \in R\}$$

where $x'' = (x_2, \ldots, x_t)$ and the pertinent graphs are defined on $F_q^{t-1}$. Other embodiments and variations are within the scope of the invention, as defined by the appended claims.

Regarding the terminology, if a function is a polynomial in some variables e.g. $x_{i-1}$ and $x_i$, then the function can be referred to as a polynomial in a larger number of variables, e.g. $x_0$ through $x_t$, even though the function is independent of the variables other than $x_{i-1}$ and $x_i$. For example, the functions $f_b$ in (64) depend only on $X_1, \ldots, X_t$, but can be referred to as polynomials in $X_0, \ldots X_t$, or in $x_0, \ldots, x_t$.

The following references are incorporated herein by reference.

REFERENCES

[1] W. Aiello, S. Lodha, and R. Ostrovsky. Fast digital identity revocation. In *In proceedings of Asiacrypt '01*, 2001.
[2] R. C. Baker, G. Harman, and J. Pintz. *The difference between consecutive primes II*, London Math. Soc. (3) 83 (2001), pp. 532.562.
[3] U. Feige. *A threshold of ln n for approximating set cover*, JACM, 1998, pp. 634-652.
[4] A. Fiat and M. Naor. *Broadcast encryption*, Crypto, 1993, pp. 480-491.
[5] E. Gafni, J. Staddon, and Y. L. Yin. *Efficient methods for integrating traceability and broadcast encryption*, Crypto, 1999, pp. 372-387.
[6] S. Jukna. Extremal Combinatorics with Applications in Computer Science, Springer-Verlag, 2001.
[7] R. Kumar, S. Rajagopalan, and A. Sahai. *Coding constructions for blacklisting problems without computational assumptions*, Crypto, 1999, pp. 609-623.
[8] R. Kumar and A. Russell. A *note on the set systems used for broadcast encryption*, SODA, 2003, pp. 470-471.
[9] J. Lotspiech, D. Naor, and M. Naor. *Revocation and tracing schemes for stateless receivers*, Crypto, 2001, pp. 41-62.
[10] A. Lubotzky, R. Phillips, and P. Samak. *Explicit expanders and the Ramanujan conjectures*, STOC, pp. 240-246. See also: A. Lubotzky, R. Phillips, and P. Sarnak, Ramanujan graphs, Combinatorica 8, 1988, pp. 261-277.
[11] M. Luby and J. Staddon. *Combinatorial Bounds for Broadcast Encryption*, Eurocrypt, 1998, pp. 512-526.
[12] C. Lund and M. Yannakakis. *On the hardness of approximating minimization problems*, JACM, 1994, pp. 960-981.
[13] S. Micali. Efficient Certificate Revocation. MIT/LCS/TM 542b, Massachusetts Institute of Technology, 1996.
[14] S. Micali. Efficient Certificate Revocation. In *Proceedings of the RSA Data Security Conference*, 1997. Also U.S. Pat. No. 5,666,416.
[15] S. Micali. NOVOMODO: scalable certificate validation and simplified PKI management. In *Proceedings of the 1st Annual PKI Research Workshop*, 2002.

The invention claimed is

1. A computer-implemented method for generating data representing an exclusive set system over a set U of entities such that each element of the exclusive set system is associated with cryptographic data, the method comprising:

obtaining, by a computer system comprising circuitry, one or more coordinate systems for the set U, wherein each coordinate system associates each entity in U with a plurality of coordinates;

determining, by the computer system, functions $f(u)$ each of which is defined on the set U, each function being a polynomial in one or more of the coordinates of u in at least one of the coordinate systems;

determining by the computer system, for each said function $f$, a corresponding subset $S_f \subset U$ such that $f$ is not equal to a predefined value on $S_f$ but is equal to the predefined value on $U \backslash S_f$, wherein said exclusive set system comprises the subsets $S_f$, and wherein each subset $S_f$ is associated with first cryptographic data for use in a cryptographic operation which is for:

(a) receiving a first input associated with an entity;
(b) receiving a second input associated with a validity property of the entity and/or with an entitlement operable to be provided to the entity; and (c) combining the first input and the second input to prove the validity property and/or provide the entitlement;

wherein at least one subset $S_f$ has a plurality of entities, and the associated first cryptographic data are for providing the first input for each entity in the subset $S_f$;

wherein said one or more coordinate systems comprise a first coordinate system which comprises s coordinates where s is a predefined integer greater than one, each coordinate having values in a finite field having fewer elements than the number of entities in the set U;

wherein for the first coordinate system, for at least one pair (i,j) of the s coordinates in the first coordinate system, for at least one subset R of U, the following property (A) holds:

(A) said functions $f(u)$ comprise a first function $ff(u)$ which is a polynomial in the ith and jth coordinates, wherein for each entity u in U the value of the jth coordinate of u is completely defined by the value of the ith coordinate of u and the value of the first function $ff(u)$ on the entity u, wherein the first function $ff(u)$ is equal to said predefined value on the subset R;

wherein the method further comprises outputting said first cryptographic data for use by devices as the first input in said cryptographic operation, wherein the devices are for obtaining second cryptographic data for use as the second input in the cryptographic operation to prove the validity property and/or provide the entitlement for each entity of one or more of the subsets $S_f$.

2. The method of claim 1 wherein:

(1) each entity represents a user operable to receive encrypted information over a network, and each said subset $S_f$ is associated with said first cryptographic data which includes a decryption key $DK_f$ provided to the users that are members of the subset $S_f$, the key being provided for decrypting said information; or (2) each entity represents a cryptographic digital certificate, and each said subset $S_f$ is associated with said first cryptographic data which includes validity data $VD_f$ for verifying that the subset $S_f$ contains only valid certificates or only invalid certificates.

3. A computer system which comprises one or more processors and which is adapted to perform the method of claim 1.

4. A non-transitory manufacture comprising a computer-readable computer program comprising one or more computer instructions operable to perform the method of claim 1 when executed by a computer system.

5. A network transmission method comprising transmitting, over a computer network, data carrier signals carrying a computer program operable to perform the method of claim 1 when executed by a computer system.

6. The method of claim 1 wherein in the first coordinate system, no two entities in R have identical ith coordinates, and no two entities in R have identical jth coordinates.

7. The method of claim 6 wherein (A) holds for each subset R of U for which:

R has no more than a predefined number r of entities wherein r is an integer greater than one but smaller than the number of entities in U, and for any coordinate i in the first coordinate system, no two entities in R have identical values of the ith coordinate.

8. The method of claim 7 wherein for each subset R of U having at least one but not more than r entities, the one or more coordinate systems comprise a coordinate system corresponding to R such that:

for each coordinate, no two entities in R have identical values of the coordinate; and (A) holds for R and at least a pair of the coordinates.

9. The method of claim 8 wherein for each subset R of U having at least one but not more than r entities, the coordinate system corresponding to R comprises a sequence of coordinates such that (A) holds for any two adjacent coordinates (ij) in said sequence if i immediately precedes j.

10. The method of claim 9 wherein, for each subset R of U having at least one but not more than r entities, for the coordinate $i_0$ which is the first coordinate in said sequence, the one or more functions $f(u)$ comprise a polynomial which is equal to the predefined value if, and only if, the $i_0$th coordinate of u is equal to the $i_0$th coordinate of at least one entity in R.

11. The method of claim 8 wherein for each subset R of U having at least one but not more than r entities, the coordinate system corresponding to R comprises a plurality of coordinates which form nodes of a tree in which at least one node has at least two immediate children, wherein (A) holds for any two adjacent coordinates (i,j) in said sequence if i is the immediate parent of j.

12. The method of claim 11 wherein, for each subset R of U having at least one but not more than r entities, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

13. The method of claim 8 wherein, for each subset R of U having at least one but not more than r entities, in the coordinate system corresponding to R, for at least one coordinate $i_0$, the one or more functions $f(u)$ comprise a polynomial which is equal to the predefined value if, and only if, the $i_0$th coordinate of u is equal to the $i_0$th coordinate of at least one entity in R.

14. The method of claim 1 wherein the coordinates of the first coordinate system comprise a plurality of coordinates forming nodes of a tree, wherein (A) holds for any two adjacent coordinates (i,j) in said sequence if i is the immediate parent of j.

15. The method of claim 14 wherein, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

16. A computer-implemented method for selecting a family of subsets of a set U such that each of said subsets is associated with cryptographic data, wherein the union of said subsets includes a predefined set of valid entities and excludes a predefined set R of invalid entities, the method comprising:

determining, by a computer system comprising circuitry, functions $f(u)$ each of which is defined on the set U, wherein each entity u ∈U is associated with a plurality of coordinates in each of one or more coordinate systems, and each function $f(u)$ is a polynomial in one or more of the coordinates of u in at least one of the coordinate systems, wherein all of said functions are equal to a predefined value on any entity u in R, and wherein for each valid entity u, at least one of said functions is not equal to the predefined value on the valid entity;

determining by the computer system, for each said function $f$, a corresponding subset $S_f$ of the valid entities on which the function is not equal to the predefined value, wherein said family of subsets comprises the subsets $S_f$, and wherein each subset $S_f$ is associated with first cryptographic data for use in a cryptographic operation which is for:
(a) receiving a first input associated with an entity;
(b) receiving a second input associated with a validity property of the entity and/or with an entitlement operable to be provided to the entity; and
(c) combining the first input and the second input to prove the validity property and/or provide the entitlement;

wherein at least one subset $S_f$ has a plurality of entities, and the associated first cryptographic data are for providing the first input for each entity in the subset $S_f$;

wherein said one or more coordinate systems comprise a first coordinate system which comprises s coordinates where s is a predefined integer greater than one, each coordinate having values in a finite field having fewer elements than the number of entities in the set U;

wherein for the first coordinate system, for at least one pair (i,j) of the s coordinates in the first coordinate system, the following property (A) holds:
(A) said functions $f(u)$ comprise a first function $ff(u)$ which is a polynomial in the ith and jth coordinates, wherein for each entity u in U the value of the jth coordinate of u is completely defined by the value of the ith coordinate of u and the value of the first function $ff(u)$ on the entity u, wherein the first function $ff(u)$ is equal to said predefined value on the subset R;

wherein the method further comprises generating second cryptographic data for use as the second input in the cryptographic operation for each subset $S_f$ and transmitting the second cryptographic data for use in the cryptographic operation.

17. The method of claim 16 wherein:
(1) each entity represents a user operable to receive encrypted information over a network, and the valid entities are entities entitled to receive the information, and the entities in the set R are not entitled to receive the information, and each said subset $S_f$ is associated with said first cryptographic data which includes a decryption key $DK_f$ provided to the users in the subset $S_f$ for decrypting said information, and the second cryptographic data includes the encrypted information; or
(2) each entity represents a cryptographic digital certificate, and wherein each said subset $S_f$ is associated with said first cryptographic data which includes validity data $VD_f$ for verifying that the subset $S_f$ contains only valid certificates or only invalid certificates, and the second cryptographic data includes a validation proof for each entity in each said subset $S_f$ of the valid entities as determined by the computer system for each said function $f$.

18. A computer system which comprises one or more processors and which is adapted to perform the method of claim 16.

19. A non-transitory manufacture comprising a computer-readable computer program comprising one or more computer instructions for a computer system to perform the method of claim 16.

20. A network transmission method comprising transmitting, over a computer network, a computer program for a computer system to perform the method of claim 16.

21. The method of claim 16 wherein in the first coordinate system, no two entities in R have identical ith coordinates, and no two entities in R have identical jth coordinates.

22. The method of claim 21 wherein the first coordinate system comprises a sequence of coordinates such that (A) holds for any two adjacent coordinates (i j) in said sequence if i immediately precedes j.

23. The method of claim 22 wherein, for the coordinate $i_0$ which is the first coordinate in said sequence, the one or more functions $f(u)$ comprise a polynomial which is equal to the predefined value if, and only if, the $i_0$th coordinate of u is equal to the $i_0$th coordinate of at least one entity in R.

24. The method of claim 21 wherein the first coordinate system comprises a plurality of coordinates which form nodes of a tree in which at least one node has at least two immediate children, wherein (A) holds for any two adjacent coordinates (if) in said sequence if i is the immediate parent of j.

25. The method of claim 24 wherein, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

26. The method of claim 16 wherein the coordinates of the first coordinate system comprise a plurality of coordinates forming nodes of a tree, wherein (A) holds for any two adjacent coordinates (i,j) in said sequence if i is the immediate parent of j.

27. The method of claim 26 wherein, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

28. A computer-implemented method for generating data representing an (n, k, r, t)-exclusive set system over a set U of entities such that each element of the exclusive set system is associated with cryptographic data, wherein n=|U|, and wherein k, r, and t are predefined positive integers, the method comprising:
obtaining, by a computer system comprising circuitry, one or more coordinate systems for the set U, wherein each coordinate system associates each entity in U with a plurality of coordinates; and
determining, by the computer system, one or more subsets $S \subset U$ in the exclusive set system, each one of said subsets S is a subset $S_f$ corresponding to a function $f(u)$ such that $f(u)$ is not equal to a predefined value on $S_f$ but is equal to the predefined value on $U \backslash S_f$, wherein each function $f(u)$ is a polynomial in one or more of the coordinates of u in at least one of the coordinate systems, the degree of $f(u)$ being at most r, wherein each subset $S_f$ is associated with first cryptographic data for use in a cryptographic operation which is for:
(a) receiving a first input associated with an entity;
(b) receiving a second input associated with a validity property of the entity and/or with an entitlement operable to be provided to the entity; and
(c) combining the first input and the second input to prove the validity property and/or provide the entitlement;

wherein at least one subset $S_f$ has a plurality of entities, and the associated first cryptographic data are for providing the first input for each entity in the subset $S_f$;

wherein said one or more coordinate systems comprise a first coordinate system which comprises s coordinates where s is a predefined integer greater than one, each coordinate having values in a finite field having fewer elements than the number of entities in the set U;

wherein for the first coordinate system, for at least one pair (i,j) of the s coordinates in the first coordinate system, for at least one subset R of U, the following property (A) holds:
  (A) said functions $f(u)$ comprise a first function $ff(u)$ which is a polynomial in the ith and jth coordinates, wherein for each entity u in U the value of the jth coordinate of u is completely defined by the value of the ith coordinate of u and the value of the first function $ff(u)$ on the entity u, wherein the first function $ff(u)$ is equal to said predefined value on the subset R;
wherein the method further comprises outputting said first cryptographic data for use by devices as the first input in said cryptographic operation, wherein the devices are for obtaining second cryptographic data for use as the second input in the cryptographic operation to prove the validity property and/or provide the entitlement for each entity of one or more of the subsets $S_f$.

29. The method of claim 28 wherein:
  (1) each entity represents a user operable to receive encrypted information over a network, and each said subset S is associated with said first cryptographic data which includes a decryption key $DK_s$ provided to the users that are elements of the subset S, the decryption key being provided for decrypting said information; or
  (2) each entity represents a cryptographic digital certificate, and wherein each said set S is associated with said first cryptographic data which includes validity data $VD_s$ for verifying that the set S contains only valid certificates or only invalid certificates.

30. The method of claim 29 wherein at least one of the functions $f$ is a polynomial of degree r.

31. A computer system which comprises one or more processors and which is adapted to perform the method of claim 28.

32. A non-transitory manufacture comprising a computer-readable computer program comprising one or more computer instructions for a computer system to perform the method of claim 28.

33. A network transmission method comprising transmitting, over a computer network, a computer program for a computer system to perform the method of claim 28.

34. The method of claim 28 wherein in the first coordinate system, no two entities in R have identical ith coordinates, and no two entities in R have identical jth coordinates.

35. The method of claim 34 wherein (A) holds for each subset R of U for which:
  R has no more than a predefined number r of entities wherein r is an integer greater than one but smaller than the number of entities in U, and
  for any coordinate i in the first coordinate system, no two entities in R have identical values of the ith coordinate.

36. The method of claim 35 wherein for each subset R of U having at least one but not more than r entities, the one or more coordinate systems comprise a coordinate system corresponding to R such that:
  for each coordinate, no two entities in R have identical values of the coordinate; and
  (A) holds for R and at least a pair of the coordinates.

37. The method of claim 35 wherein for each subset R of U having at least one but not more than r entities, the coordinate system corresponding to R comprises a plurality of coordinates which form nodes of a tree, wherein (A) holds for any two adjacent coordinates (i,j) in said sequence if i is the immediate parent of j.

38. The method of claim 37 wherein, for each subset R of U having at least one but not more than r entities, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

39. The method of claim 34 wherein the coordinates of the first coordinate system comprise a plurality of coordinates forming nodes of a tree, wherein (A) holds for any two adjacent coordinates (i,j) in said sequence if i is the immediate parent of j.

40. The method of claim 39 wherein, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

41. A computer-implemented method for selecting a cover from an (n,k,r,t)-exclusive set system, the system being defined over a set U of entities such that each element of the exclusive set system is associated with cryptographic data, wherein n=|U|, and wherein k, r, and t are predefined positive integers, the cover being for a set U\R where R ⊂ U and |R|<r, the cover comprising at most t elements, the method comprising:
  selecting, for the cover, by a computer system comprising circuitry, one or more elements S from the exclusive set system, each one of said elements S is a subset $S_f$ corresponding to a function $f(u)$ such that $f(u)$ is not equal to a predefined value on $S_f$ but is equal to the predefined value on $U \backslash S_f$, wherein each function $f(u)$ is a polynomial in one or more of coordinates of u in at least one coordinate system, the degree of $f(u)$ being at most r, wherein each subset $S_f$ is associated with first cryptographic data for use in a cryptographic operation which is for:
    (a) receiving a first input associated with an entity;
    (b) receiving a second input associated with a validity property of the entity and/or with an entitlement operable to be provided to the entity; and
    (c) combining the first input and the second input to prove the validity property and/or provide the entitlement;
  wherein at least one subset $S_f$ has a plurality of entities, and the associated first cryptographic data are for providing the first input for each entity in the subset $S_f$;
  wherein said one or more coordinate systems comprise a first coordinate system which comprises s coordinates where s is a predefined integer greater than one, each coordinate having values in a finite field having fewer elements than the number of entities in the set U;
  wherein for the first coordinate system, for at least one pair (I,j) of the s coordinates in the first coordinate system, the following property (A) holds:
    (A) said functions $f(u)$ comprise a first function $ff(u)$ which is a polynomial in the ith and jth coordinates, wherein for each entity u in U the value of the jth coordinate of u is completely defined by the value of the ith coordinate of u and the value of the first function $ff(u)$ on the entity u, wherein the first function $ff(u)$ is equal to said predefined value on the subset R;
  wherein the method further comprises generating second cryptographic data for use as the second input in the cryptographic operation for each subset $S_f$; and transmitting the second cryptographic data for use in the cryptographic operation.

42. The method of claim 41 wherein:

(1) each entity represents a user operable to receive encrypted information over a network, and the entities in U\R are entitled to receive the information, and the entities in the set R are not entitled to receive the information, and each said set S is associated with said first cryptographic data which includes a decryption key $DK_s$ provided to the users that are elements of the set S, the key being provided for decrypting said information, and the second cryptographic data includes the encrypted information; or (2) each entity represents a cryptographic digital certificate, and wherein each said set S is associated with said cryptographic data which includes validity data $VD_s$ for verifying that the set S contains only valid certificates or only invalid certificates, and the second cryptographic data includes a validation proof for each entity in each said subset $S_f$ selected for the cover by the computer system.

43. A computer system which comprises one or more processors and which is adapted to perform the method of claim 41.

44. A non-transitory manufacture comprising a computer-readable computer program comprising one or more computer instructions for a computer system to perform the method of claim 41.

45. A network transmission method comprising transmitting, over a computer network, a computer program for a computer system to perform the method of claim 41.

46. The method of claim 41 wherein in the first coordinate system, no two entities in R have identical ith coordinates, and no two entities in R have identical jth coordinates.

47. The method of claim 46 wherein the first coordinate system comprises a plurality of coordinates which form nodes of a tree, wherein (A) holds for any two adjacent coordinates (i,j) in said sequence if i is the immediate parent of j.

48. The method of claim 47 wherein, for the coordinate $i_0$ which is the root of said tree, the one or more functions $f(u)$ comprise a polynomial which is equal to the predefined value if, and only if, the $i_0$th coordinate of u is equal to the $i_0$th coordinate of at least one entity in R.

49. A computer-implemented method for generating data representing an exclusive set system CC(U) over a set U of entities, the method comprising:

generating, by a computer system comprising circuitry, one or more exclusive set systems $CC(U_B)$ for each of a plurality of subsets $\{U_B\}$ of U, wherein at least one of the exclusive set systems $CC(U_B)$ is generated by the method of claim 1;

obtaining, by the computer system, the exclusive set system for U as a union of the systems $CC(U_B)$.

50. The method of claim 49 wherein:

(1) each entity represents a user operable to receive encrypted information over a network, and each element $S_f$ of the exclusive set system is associated with said first cryptographic data which includes a decryption key $DK_s$ provided to the users that are members of the element $S_f$, the key being provided for decrypting said information; or (2) each entity represents a cryptographic digital certificate, and each said element $S_f$ is associated with said first cryptographic data which includes validity data $VD_s$ for verifying that the subset $S_f$ contains only valid certificates or only invalid certificates.

51. A computer system which comprises one or more processors and which is adapted to perform the method of claim 49.

52. A non-transitory manufacture comprising a computer-readable computer program comprising one or more computer instructions for a computer system to perform the method of claim 49.

53. A network transmission method comprising transmitting, over a computer network, a computer program for a computer system to perform the method of claim 49.

54. A computer-implemented method for selecting a family of subsets of a set U such that each of said subsets is associated with cryptographic information, wherein the union of said subsets includes a predefined set of valid entities and excludes a predefined set R of invalid entities, the method comprising:

determining, by a computer system comprising circuitry, a plurality of disjoint subsets $\{U_j\}$ of the set U such that the union of the subsets $U_B$ equals U, wherein each subset $U_B$ is associated with an exclusive set system $CC(U_B)$ with the maximum revoked set size $r_B \geq |R_B|$, where $R_B = R \cap U_B$;

for each subset $U_B$, selecting, by the computer system, a cover for $U_B \backslash R_B$ from $CC(U_B)$, wherein the union of said covers provides said family of subsets, wherein for at least one subset $U_B$, the cover is selected by the method of claim 41.

55. The method of claim 54 wherein:

(1) each entity represents a user operable to receive encrypted information over a network, and each element S of the exclusive set system is associated with said first cryptographic data which includes a decryption key $DK_s$ provided to the users that are members of the element S, the key being provided for decrypting said information; or (2) each entity represents a cryptographic digital certificate, and each said element S is associated with said cryptographic data which includes validity data $VD_s$ for verifying that the subset S contains only valid certificates or only invalid certificates, and the second cryptographic data includes a validation proof for each entity in each said subset $S_f$ selected for the cover by the computer system.

56. A computer system which comprises one or more processors and which is adapted to perform the method of claim 54.

57. A non-transitory manufacture comprising a computer-readable computer program comprising one or more computer instructions for a computer system to perform the method of claim 54.

58. A network transmission method comprising transmitting, over a computer network, a computer program for a computer system to perform the method of claim 54.

59. A non-transitory manufacture comprising computer-readable data for defining an (n,k,r,t)-exclusive set system over a set U, where n,k,r,t are predefined positive integers, the exclusive set system comprising one or more elements S each of which is a subset $S_f$ corresponding to a function $f(u)$ such that $f(u)$ is not equal to a predefined value on $S_f$ but is equal to the predefined value on $U \backslash S_f$, wherein each function $f(u)$ is a polynomial in one or more of coordinates of u in at least one coordinate system, the degree of $f(u)$ being at most r, wherein each subset $S_f$ is associated with cryptographic data for use in a cryptographic operation which is for:

(a) receiving a first input associated with an entity;
(b) receiving a second input associated with a validity property of the entity and/or with an entitlement operable to be provided to the entity; and
(c) combining the first input and the second input to prove the validity property and/or provide the entitlement.

* * * * *